United States Patent [19]

Shibata et al.

[11] Patent Number: 5,191,024
[45] Date of Patent: Mar. 2, 1993

[54] HYDROGENATED DIENE BLOCK COPOLYMER AND COMPOSITION COMPRISING THE SAME

[75] Inventors: Tooru Shibata; Toshio Teramoto; Yoshiharu Hashiguchi; Kunio Goshima, all of Yokkaichi, Japan

[73] Assignee: Japan Synthetic Rubber Co., Ltd., Tokyo, Japan

[21] Appl. No.: 524,809

[22] Filed: May 18, 1990

[30] Foreign Application Priority Data

May 19, 1989 [JP] Japan .................. 1-124429
May 19, 1989 [JP] Japan .................. 1-124430

[51] Int. Cl.$^5$ .................. C08F 297/04; C08L 53/02
[52] U.S. Cl. .................. 525/314; 525/285; 525/940; 525/279; 525/286; 525/301; 525/303; 525/310; 525/312; 525/98; 525/100; 525/191; 525/223; 525/238; 525/240; 525/241
[58] Field of Search .............. 525/314, 940, 285, 279, 525/301, 303, 310, 312, 286

[56] References Cited

U.S. PATENT DOCUMENTS

| | | | |
|---|---|---|---|
| 3,431,323 | 3/1969 | Jones | 260/880 |
| 3,644,588 | 2/1972 | Hassell | 260/879 |
| 4,242,470 | 12/1980 | Gergen et al. | |
| 4,628,072 | 12/1986 | Shiraki et al. | 525/57 |
| 4,797,447 | 1/1989 | Gergen et al. | 525/314 |
| 4,868,243 | 9/1989 | Gelles et al. | 525/314 |
| 4,868,245 | 9/1989 | Pettick et al. | 525/314 |

FOREIGN PATENT DOCUMENTS

| | | |
|---|---|---|
| 0168203 | 1/1986 | European Pat. Off. |
| 0209874 | 1/1987 | European Pat. Off. |
| 2312752 | 2/1982 | Fed. Rep. of Germany |
| 1359740 | 7/1974 | United Kingdom |
| 1581167 | 12/1980 | United Kingdom |

*Primary Examiner*—Ana L. Carrillo
*Assistant Examiner*—Vasu S. Jagannathan
*Attorney, Agent, or Firm*—Oblon, Spivak, McClelland, Maier & Neustadt

[57] ABSTRACT

A hydrogenated diene block copolymer having a polystyrene-reduced number-average molecular weight of 50,000–600,000 which is a hydrogenation product of an (A)—(B) block copolymer in which (A) means an alkenyl aromatic compound polymer block and (B) means a conjugated diene homopolymer block wherein the vinyl content of the conjugated diene portion is more than 60%, or an alkenyl aromatic compound-conjugated diene random copolymer block wherein the vinyl content of the conjugated diene portion is 15% or more, an (A)—(B)—(C) block copolymer in which (A) and (B) are as defined above and (C) means an alkenyl aromatic compound-conjugated diene copolymer tapered block wherein the proportion of the alkenyl aromatic compound increases gradually, or an (A)—(B)—(A) block copolymer in which (A) and (B) are as defined above, in which block copolymer (1) the weight proportion of theh alkenyl aromatic compound/the conjugated diene is 5/95 to 60/40, and
(2) the content of the bound alkenyl aromatic compound in at least one block (A) is at last 3% by weight and the total of the bound alkenyl aromatic compound contents in the block (A) and the block (C) or the two block (A)'s is 3–50% by weight based on the total monomers, and in which hydrogenation product at least 80% of the double bonds of the conjugated diene portion is saturated by the hydrogenation. Said hydrogenated diene block copolymer is useful as a modifier for polar resins, non-polar resins or both of them.

4 Claims, No Drawings

HYDROGENATED DIENE BLOCK COPOLYMER AND COMPOSITION COMPRISING THE SAME

This invention relates to a special hydrogenated block copolymer. More particularly, this invention relates to a (modified) hydrogenated diene block copolymer which is pelletizable by itself and has excellent processability and further has excellent weather resistance, impact resistance and paintability (peeling resistance) and which can suitably provide a composite system with improved impact resistance, paintability (peeling resistance), adhesion and flexibility, as well as to a composition comprising the (modified) hydrogenated diene block copolymer.

Diene copolymers having double bond unsaturations in the molecule are inferior in thermal stability, weather resistance and ozone resistance. As the method for improving these properties, there are known methods comprising hydrogenating the double bond unsaturations. These methods are disclosed in, for example, Japanese Patent Publication Nos. 43-19960, 45-39275 and 48-3555 and Japanese Patent Application Kokai Nos. 56-62805 and 59-133203. The hydrogenated polymers obtained by the methods disclosed in the above documents have heat resistance and ozone resistance as desired and are in wide use for modification of resin and other uses.

Other hydrogenated polymers are disclosed in, for example, Japanese Patent Publication Nos. 63-14721 and 48-30151.

Also, ethylene-α-olefin copolymers, etc. are known as a polymer having excellent heat resistance and weather resistance.

These polymers, however, are insufficient for blending with a non-polar resin or a polar resin to obtain a composition well balanced in impact resistance and moldability.

The present inventors have made study on hydrogenated polymers and, as a result, found that a particular hydrogenated diene block copolymer can solve the above-mentioned technical problem of the prior art.

An object of this invention is to provide a (modified) hydrogenated block copolymer which can be easily pelletized to give pellets with improved blocking resistance, which has excellent heat resistance, weather resistance and ozone resistance, and which when used as a modifier for other resins, can improve their properties in low temperature impact resistance, weather resistance, paintability (peeling resistance), flexibility, ozone resistance, etc.

Another object of this invention is to provide a composition of improved properties, comprising (1) a (modified) hydrogenated diene block copolymer and (2) a non-polar resin and/or a polar resin.

According to this invention, there is provided a hydrogenated diene block copolymer having a polystyrene-reduced number-average molecular weight of 50,000-600,000 which is a hydrogenation product of an (A)—(B) block copolymer in which (A) means an alkenyl aromatic compound polymer block [hereinafter referred to as "Block (A)"] and (B) means a conjugated diene homopolymer block wherein the vinyl content of the conjugated diene portion is more than 60%, or an alkenyl aromatic compound-conjugated diene random copolymer block wherein the vinyl content of the conjugated diene portion is 15% or more [hereinafter referred to as "Block (B)"], an (A)—(B)—(C) block copolymer in which (A) means Block (A), (B) means Block (B) and (C) means an alkenyl aromatic compound-conjugated diene copolymer tapered block wherein the proportion of the alkenyl aromatic compound increases gradually [hereinafter referred to as "Tapered Block (C)"], or an (A)—(B)—(A) block copolymer in which (A) means Block (A) and (B) means Block (B), in which block copolymer (1) the weight proportion of the alkenyl aromatic compound/the conjugated diene is 5/95 to 60/40, and (2) the content of the bound alkenyl aromatic compound in at least one Block (A) is at least 3% by weight and the total of the bound alkenyl aromatic compound contents in two Block (A)'s or Block (A) and Tapered Block (C) is 3–50% by weight based on the total monomers, and in which hydrogenation product at least 80% of the double bonds of the conjugated diene portion is saturated by the hydrogenation.

This invention also provides a modified hydrogenated diene block copolymer obtained by modifying 100 parts by weight of the above-mentioned hydrogenated diene block copolymer with 0.01-20 parts by weight of an unsaturated compound having at least one functional group selected from the group consisting of acid anhydride group, carboxyl group, hydroxyl group, amino group and epoxy group.

This invention further provides a hydrogenated diene block copolymer composition comprising 1–99% by weight of the above hydrogenated diene block copolymer and/or modified hydrogenated diene block copolymer (I) [hereinafter these are generically referred to as "(modified) hydrogenated diene block copolymer"] and 99-1% by weight of a non-polar resin (II) and/or a polar resin (III).

The alkenyl aromatic compound used in the hydrogenated diene block copolymer of this invention includes styrene, tert-butylstyrene, α-methylstyrene, p-methylstyrene, divinylbenzene, 1,1-diphenylstyrene, N,N-dimethyl-p-aminoethylstyrene, N,N-diethyl-p-aminoethylstyrene, vinylpyridine, etc. Of them, styrene and α-methylstyrene are particularly preferable.

The conjugated diene includes 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene, etc. In order to obtain a hydrogenated diene block copolymer of excellent properties and industrial utilization, 1,3-butadiene, isoprene and 1,3-pentadiene are preferable, and 1,3-butadiene is more preferable.

In the hydrogenated diene block copolymer of this invention selected from an (A)—(B) block copolymer consisting of Block (A) and Block (B), an (A)—(B)—(C) block copolymer consisting of Block (A), Block (B) and Tapered Block (C), and an (A)—(B)—(A) block copolymer consisting of Block (A), Block (B) and Block (A), the weight proportion of the alkenyl aromatic compound/the conjugated diene in the total monomers is required to be 5/95 to 60/40, preferably 7/93 to 40/60.

When the proportion of the alkenyl aromatic compound is less than 5% by weight, the resulting hydrogenated diene block copolymer, when blended with other resin, gives a resin composition with insufficient improvement. When the hydrogenated diene block copolymer is blended with, for example, a polypropylene, the resulting composition has insufficient balance in impact resistance and rigidity. When the proportion of the alkenyl aromatic compound is more than 60% by weight, the resulting hydrogenated diene block copolymer is resinous and, when blended with other resin, gives a resin composition with insufficient improvement in impact resistance, particularly low-temperature impact resistance.

The content of the bound alkenyl aromatic compound in at least one Block (A) is at least 3% by weight, preferably 3-20% by weight, more preferably 5-15% by weight, and the total of the bound alkenyl aromatic compound contents in two Block (A)'s or Block (A) and Tapered Block (C) is 3-50% by weight, preferably 5-40% by weight, more preferably 5-25% by weight. When the content of the bound alkenyl aromatic compound in at least one Block (A) or the total of the bound alkenyl aromatic compound contents in two Block (A)'s or Block (A) and Tapered Block (C) is less than 3% by weight based on the total monomers, the resulting hydrogenated diene block copolymer tends to cause blocking when pelletized and give poor appearance when blended with other resin. When the total of the bound alkenyl aromatic compound contents in two Block (A)'s or Block (A) and Tapered Block (C) is more than 50% by weight, the resulting hydrogenated diene block copolymer is resinous and, when blended with other resin, provides a resin composition with insufficient improvement in impact resistance, particularly low-temperature impact resistance.

The vinyl content in the conjugated diene portions in the alkenyl aromatic compound-conjugated diene random copolymer [Block (B)] is preferably 15% or more. Production of the Block (B) having a vinyl content of less than 15% requires severe polymerization conditions and is disadvantageous when made industrially, and the resulting hydrogenated diene block copolymer, when blended with other resin, provides a resin composition with insufficient improvement in impact resistance.

When the hydrogenated diene block copolymer is blended with, for example, a polypropylene resin to obtain a resin composition having satisfactory impact resistance and rigidity, the above vinyl content is preferably 15-60%, more preferably 20-55%.

In order for the hydrogenated diene block copolymer to be able to give improved flexibility to a resin to be blended therewith, the vinyl content in the conjugated diene portion in Block (B) is preferably more than 60%, more preferably 70% or more, particularly preferably 80% or more.

The vinyl content used herein refers to the content of the conjugated diene monomer unit formed by polymerization through the double bond of 1,2- or 3,4-position.

In the hydrogenated diene block copolymer of this invention, it is further required that at least 80%, preferably 90% or more, more preferably 95-100% of the double bonds of the conjugated diene portions is saturated by the hydrogenation. When less than 80% of the double bonds is saturated, the resulting hydrogenated diene block copolymer is inferior in heat resistance, weather resistance and ozone resistance.

Furthermore, the hydrogenated diene block copolymer of this invention has a polystyrene-reduced number-average molecular weight of 50,000-600,000, preferably 80,000-500,000. When the polystyrene-reduced number-average molecular weight is outside the above range, no sufficient improvement is obtained when the resulting hydrogenated diene block copolymer is blended with other resin. When the molecular weight is less than 50,000, the resulting composition has reduced impact resistance. When the molecular weight is more than 600,000, the composition has reduced fluidity, processability and appearance.

When in the block copolymer of this invention the vinyl content in the conjugated diene portion in Block (B) is 60% or less, the resulting hydrogenated diene block copolymer has a polystyrene-reduced number-average molecular weight of preferably 300,000 or less, more preferably 250,000 or less in view of the modification effect when blended with other resin.

The hydrogenated diene block copolymer of this invention has a melt flow rate as measured at 230° C under a load of 12.5 kg, of preferably at least 0.1 g/10 min, more preferably at least 0.5 g/10 min. When the melt flow rate is less than 0.1 g/10 min, the resulting hydrogenated diene block copolymer is difficult to pelletize.

From the surface gloss standpoint, the hydrogenated diene block copolymer of this invention has a melt flow rate as measured at 230° C. under a load of 5 kg, of preferably 0.1 g/10 min or more, more preferably 1-100 g/10 min.

The hydrogenated diene block copolymer of this invention can be obtained by subjecting Block (A), Block (B) and, as necessary, Tapered Block (C) or another Block (A) to living anionic polymerization in an organic solvent using an organic alkali metal compound as an initiator to form a block copolymer and then hydrogenating the block copolymer.

The organic solvent is a hydrocarbon solvent such as pentane, hexane, heptane, octane, methylcyclopentane, cyclohexane, benzene, xylene or the like.

The organic alkali metal compound as an initiator is preferably an organolithium compound.

The organolithium compound is an organomonolithium compound, an organodilithium compound or an organopolylithium compound. Specific examples of these include ethyllithium, n-propyllithium, isopropyllithium, n-butyllithium, sec-butyllithium, tert-butyllithium, hexamethylenedilithium, butadienyllithium and isoprenyldilithium. The organolithium compound is used in an amount of ordinarily 0.001-1 part by weight, preferably 0.02-0.2 part by weight per 100 parts by weight of the monomers.

In the above living anionic polymerization, a Lewis base (e.g. ether, amine) can be used as an agent for controlling the micro structure, i.e. the vinyl content of conjugated diene portion. The ether specifically includes diethyl ether, tetrahydrofuran, propyl ether, butyl ether, higher ethers, and ether derivatives of polyethylene glycols, such as ethylene glycol dibutyl ether, diethylene glycol dimethyl ether, diethylene glycol dibutyl ether, triethylene glycol dimethyl ether and the like. The amine includes tetramethylethylenediamine, pyridine, tributylamine, etc. The Lewis base is used together with the above-mentioned organic solvent.

The polymerization reaction is effected usually at $-30°$ C. to $+150°$ C.

The living anionic polymerization can be effected by controlling the system temperature to a given temperature, or under a temperature increase without removing the heat generated.

The (A)—(B) block copolymer can be produced by any method. In general, however, first Block (A) or Block (B) is formed in the above-mentioned organic solvent in the presence of a polymerization initiator such as the above-mentioned alkali metal compound;

then, Block (B) or Block (A) is formed. Either of Block (A) or Block (B) may be formed first.

The boundary between Block (A) and Block (B) need not be made clear.

The (A)—(B)—(C) block copolymer or the (A)—(B)—(A) block copolymer can be produced by polymerizing an alkenyl aromatic compound in an organic solvent in the presence of an organolithium polymerization initiator to form Block (A), then polymerizing a conjugated diene and an alkenyl aromatic compound to form Block (B), and thereafter polymerizing a conjugated diene and an alkenyl aromatic compound to form Tapered Block (C) or polymerizing an alkenyl aromatic compound alone to form another Block (A). Alternatively, the above block copolymer can be produced by first forming Papered Block (C) or Block (A), then forming Block (B) and further forming another Block (A).

The thus obtained (A)—(B) block copolymer, (A)—(B)—(C) block copolymer or (A)—(B)—(A) block copolymer may be reacted with a coupling agent and consequently may be changed to a longer chain or branched chain block copolymer as represented by the following general formula:

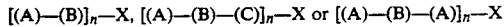

[(A)—(B)]$_n$—X, [(A)—(B)—(C)]$_n$—X or [(A)—(B)—(A)]$_n$—X wherein (A), (B) and (C) are the same as defined above, n is an integer of 2-4 and X is a coupling agent residue.

The coupling agent includes, for example, diethyl adipate, divinylbenzene, tetrachlorosilicon, butyltrichlorosilicon, tetrachlorotin, butyltrichlorotin, dimethyldichlorosilane, methyldichlorosilane, tetrachlorogermanium, 1,2-dibromoethane, 1,4-chloromethylbenzene, bis(trichlorosilyl)ethane, epoxidized linseed oil, tolylene diisocyanate and 1,2,4-benzenetriisocyanate.

The alkenyl aromatic compound content in the block copolymer can be controlled by the amount of monomer(s) fed in each polymerization stage, and the vinyl content in the conjugated diene portion in the block copolymer can be controlled by the amount of the micro structure-controlling agent used. The polystyrene-reduced number-average molecular weight and melt flow rate of the block copolymer can be controlled by the amount of polymerization initiator (e.g. n-butyllithium) to be added.

The hydrogenated diene block copolymer of this invention can be produced by dissolving the above-obtained block copolymer in an inert solvent and hydrogenating the copolymer with hydrogen of 1-100 kg/cm$^2$ at 20°-150° C. in the presence of a hydrogenation catalyst.

The inert solvent used in the hydrogenation includes hydrocarbon solvents such as hexane, heptane, cyclohexane, benzene, toluene, ethylbenzene and the like, as well as polar solvents such as methyl ethyl ketone, ethyl acetate, diethyl ether, tetrahydrofuran and the like.

The hydrogenation catalyst includes catalysts consisting of a noble metal (e.g. palladium, ruthenium, rhodium, platinum or the like) supported on carbon, silica, diatomaceous earth or the like; catalysts consisting of a complex of rhodium, ruthenium, platinum or the like; catalysts consisting of (1) a salt of an organic carboxylic acid with nickel, cobalt or the like and (2) an organoaluminum or an organolithium; hydrogenation catalysts consisting of (1) a bis(cyclopentadienyl) group-containing transition metal compound and (2) a reducing organometal compound such as organoaluminum, organolithium, organomagnesium or the like; and so forth.

The hydrogenated diene block copolymer of this invention can also be produced by effecting a hydrogenation reaction using a reducing compound (e.g. lithium aluminum hydride, p-toluenesulfonyl hydrazide or the like, a hydrogen storage alloy (e.g. Zr-Ti-Fe-V-Cr alloy, Zr-Ti-Nb-Fe-V-Cr alloy, LaNi$_5$ alloy or the like) or the like.

The hydrogenation degree of the double bonds of the conjugated diene portion in Block (B) of the hydrogenated diene block copolymer of this invention can be controlled by changing the kind of the hydrogenation catalyst, the amount of reducing compound added, the hydrogen pressure in hydrogenation reaction and the reaction time.

The catalyst residue is removed from the solution containing the hydrogenated diene block copolymer; a phenol type or amine type antioxidant is added; and from the resulting copolymer solution can be easily isolated the hydrogenated diene block copolymer.

The isolation of the hydrogenated diene block copolymer can be effected, for example, by adding acetone, an alcohol or the like to the copolymer solution to precipitate the copolymer, or by pouring the copolymer solution into boiling water with stirring to remove the solvent by vaporization.

The modified hydrogenated diene block copolymer of this invention can be obtained by introducing a functional group into the hydrogenated diene block copolymer.

The unsaturated compound used for introducing a functional group into the hydrogenated diene block copolymer is an unsaturated compound having at least one functional group selected from the group consisting of acid anhydride group, carboxyl group, hydroxyl group, amino group and epoxy group.

Specific examples of the unsaturated compound having an acid anhydride group or a carboxyl group are $\alpha,\beta$-unsaturated carboxylic acids and their anhydrides such as acrylic acid, methacrylic acid, ethacrylic acid, maleic acid, maleic anhydride, fumaric acid, itaconic acid, itaconic anhydride, Hymic acid (trade name), Hymic acid anhydride and the like.

The unsaturated compound having a hydroxyl group includes hydroxypropyl (meth)acrylate, hydroxyethyl (meth)acrylate, etc.

The unsaturated compound having an amino group includes diethylaminomethyl (meth)acrylate, dimethylaminoethyl (meth)acrylate, vinylpyridine, etc.

The unsaturated compound having an epoxy group includes glycidyl (meth)acrylate, allyl glycidyl ether, vinyl glycidyl ether, etc.

Of these, preferred are unsaturated compounds having an acid anhydride group or a carboxyl group, in view of the easy procedure of addition reaction to hydrogenated diene block copolymer. Particularly preferred are unsaturated compounds having an acid anhydride group.

The amount of unsaturated compound addition-bonded to the hydrogenated diene block copolymer is 0.01-20 parts by weight, preferably 0.2-5 parts by weight per 100 parts by weight of the hydrogenated diene Block copolymer. When the amount is less than 0.01 part by weight, there can be obtained no sufficient improvement in impact resistance, chemical resistance and paintability (peeling resistance). When the amount is more than 20 parts by weight, there appears deterioration in electrical properties, moisture resistance, etc.

The addition reaction of functional group-containing unsaturated compound to hydrogenated diene block copolymer of this invention can be effected utilizing the method described in Japanese Patent Publication No. 39-6384. That is, a hydrogenated diene block copolymer of this invention is used in place of an olefin rubber; the copolymer and a functional group-containing unsaturated compound are subjected to mixing-heating in a solid state, whereby addition reaction can be effected between them.

The mixing-heating can be effected batchwise using a closed type kneader, or continuously using an extruder or the like. In this case, it is possible to add a peroxide to accelerate the reaction and, as necessary, to add a stabilizer.

To the (modified) hydrogenated diene block copolymer of this invention can be added conventional additives, for example, an antioxidant, a heat stabilizer, an ultraviolet absorber, a lubricant, a coloring agent and a flame retardant.

The (modified) hydrogenated diene block copolymer of this invention can be used as it is or as a modifier for various resins and is useful as a material for automobile parts, electric or electronic parts, films, sheets, etc.

The (modified) hydrogenated diene block copolymer (I) of this invention can be used alone, or can be used as a blend with a non-polar resin (II) and/or a polar resin (III) and, as necessary, other copolymer rubber.

The proportion of the resin to be blended with the (modified) hydrogenated diene block copolymer of this invention is 1-99% by weight, preferably 3-90% by weight. The optimum proportion is varied depending on the application purpose of the resulting blend.

The modification of resin by the (modified) hydrogenated diene block copolymer of this invention is unattainable when the copolymer is added in an amount of less than 1% by weight.

The non-polar resin (II) used in this invention includes polyethylene, high-molecular polyethylene, high-density polyethylene, medium-density polyethylene, low-density polyethylene, LLDPE (linear low-density polyethylene), polybutene, polyisobutylene, polypropylene, polystyrene, HIPS (high-impact polystyrene), polymethylstyrene, polymethylene, etc. Preferable non-polar resins (II) are polypropylene, polyethylene and polystyrene.

The proportion of the present (modified) hydrogenated diene block copolymer/the non-polar resin (II) is 1-99% by weight/99-1% by weight. In order to obtain sufficient modification of the component (II) by addition of the component (I), the proportion of the component (I) is preferably 3-90% by weight, more preferably 5-70% by weight.

When the proportion of the component (I) is too low, no sufficient modification is obtained. When the proportion is too high, the inherent properties of the component (II) are sacrificed.

The (modified) hydrogenated diene block copolymer to be blended with the non-polar resin (II) is preferably the unmodified hydrogenated diene block copolymer. This unmodified hydrogenated diene block copolymer has good compatibility with the non-polar resin (II), and can give a composition with the non-polar resin (II) which is better balanced in impact resistance, processability, appearance, printability, paintability (peeling resistance), etc. than an ethylene-propylene-(polyene) rubber or the like which is conventionally used as a modifier.

In modifying a polypropylene resin widely used as, for example, a material for automobile bumper and instrumental panels, the proportion of the component (I)/the component (II) is 15-60/85-40 by weight in many cases. In this case, the rigidity-impact resistance balance of the composition is considerably higher than when a conventional ethylene-propylene rubber is used as a modifier.

When the component (I)-component (II) composition is formed into a film or a sheet, the weight proportion of the component (I)/the component (II) is 3-50/97-50 in many cases. In this case, the composition is superior in heat-seal strength and impact resistance.

The component (I)-component (II) composition is also suitable in the field of thermoplastic elastomers used as a material for automobile interior parts, bumper, etc. which are conventionally obtained by subjecting a polypropylene resin and an ethylene-propylene-polyene rubber as major components to partial crosslinking with a peroxide or the like.

In this case, the component (I) and the component (II) are used in a weight proportion of 10/90 to 90/10, and for satisfying the requirements of fluidity, hardness, etc., there are further added a mineral oil, a low-molecular polymer, a peroxide-decomposable polymer, etc. This composition is superior to conventional compositions using, as a modifier, an ethylene-propylene-polyene rubber, in fluidity, mechanical strengths and appearance of molded article.

When in the composition of the hydrogenated diene block copolymer (I) and the non-polar resin (II), part or the whole of the component (I) is replaced by the modified hydrogenated diene block copolymer, the resulting composition has a slightly lower mechanical strength but higher paintability (peeling resistance) and chemical resistance.

When at least one (modified) hydrogenated diene block copolymer obtained from a diene block copolymer before hydrogenation represented by the general formula $[(A)-(B)-(C)]_n-X$, $[(A)-(B)]_n-X$ or $[(A)-(B)-(A)]_n-X$ [(A), (B) and (C) are the same as defined above, n is an integer of 2-4, and X is a coupling agent residue] is blended in a proportion of 40-90% by weight, preferably 50-80% by weight, more preferably 60-80% by weight, more preferably 60-80% by weight with 10-60% by weight, preferably 20-50% by weight, more preferably 20-40% by weight, of a polyolefin polymer, the resulting composition is a thermoplastic elastomer well balanced in mechanical properties, thermal ageing resistance, hardness (low hardness), elongation set (low tension set) and transparency.

When in the above case the proportion of the polyolefin polymer is more than 60% by weight, no composition can be obtained which is excellent in elongation set, hardness (low hardness) and thermoplastic elastomer properties. When the proportion is less than 10% by weight, no composition can be obtained which is excellent in mechanical properties and thermal ageing resistance.

In obtaining a thermoplastic elastomer composition, it is preferable to subject the (modified) hydrogenated diene block copolymer component to crosslinking according to a known crosslinking method. In the crosslinking method, there can be used peroxide crosslinking, resin crosslinking, sulfur crosslinking, etc. which are employed for ordinary rubbers. Peroxide crosslinking and resin crosslinking are preferable, and peroxide crosslinking is more preferable.

The specific crosslinking agent includes those crosslinking agents, crosslinking aids and crosslinking accelerators which are described in, for example, "Crosslinking Agents Handbook (by Shinzo Yamashita and Tosuke Kaneko, published by Taiseisha)".

The thermoplastic elastomer composition of this invention can contain an oil or a plasticizer as a softening agent in a proportion of 1-200 parts by weight per 100 parts by weight of the composition.

As the oil, there can be used an aromatic, naphthenic or paraffinic oil.

As the plasticizer, there can be used a phthalate, adipate, phosphate, polyether or polyester plasticizer.

In the composition of this invention comprising the (modified) hydrogenated diene block copolymer (I) and the non-polar resin (II), the non-polar resin (II) may be a combination of at least two non-polar resins and the composition may further comprise conventionally used compounding agents such as high polymer [e.g. ethylene-propylene-(polyene) rubber, hydrogenated styrene-butadiene-styrene triblock copolymer, hydrogenated acrylonitrile-butadiene copolymer, ethylenevinyl acetate copolymer, butyl rubber or the like], reinforcing agent (e.g. inorganic whiskers, carbon black or the like), softening agent (e.g. mineral oil, low-molecular weight polymer or the like), anti-oxidant, light stabilizer, slip agent and the like.

The method of producing the above composition is not critical and can be a conventional method. In producing, for example, a composition comprising the (modified) hydrogenated diene block copolymer (I) and a polypropylene resin (II), there can be used, for example, a method wherein the two components are treated by a kneading means such as extruder, kneader, blender, Banbury mixer, roll and the like, a method wherein a polypropylene is produced in the presence of the (modified) hydrogenated diene block copolymer of this invention to obtain the composition of this invention, or a method which is a combination of the above two methods.

By melt-mixing (M) 10-90 parts by weight of an olefin resin and (N) 90-10 parts by weight of at least one of the (modified) hydrogenated diene block copolymers of this invention in the presence of a crosslinking agent, there can be obtained a polyolefin type thermoplastic elastomer composition suitable for low-hardness applications and superior in fatigue resistance, mechanical properties, moldability and appearance of molded article.

The olefin resin (M) is a crystalline olefin polymer obtained by subjecting α-olefin monomers such as ethylene, propylene, 1-butene and the like to homopolymerization or copolymerization, and is preferably a crystalline polypropylene. In carrying out this invention, these olefin resins can be used alone or in combination of two or more.

In the above thermoplastic elastomer composition, the amount of the olefin resin (M) is 10-90% by weight, preferably 30-70% by weight.

When the amount of the olefin resin (M) is more than 10% by weight, the resulting composition is superior in strength and fatigue resistance. When the amount is not more than 90% by weight, the composition has excellent characteristics as elastomer in respect of hardness.

The above composition may further comprise, in order to additionally impart thereto a function possessed by conventional rubbers, a synthetic rubber (e.g. ethylene-propylene copolymer rubber, styrene-butadiene copolymer rubber, polyisoprene rubber, acrylic rubber, acrylonitrile-butadiene copolymer rubber, silicone rubber, hydrogenated acrylonitrile-butadiene copolymer rubber) or natural rubber.

As the crosslinking agent used in the above composition, there is ordinarily used a radical-generating agent such as organic peroxide or the like.

The organic peroxide includes 2,5-dimethyl-2,5-di(-tert-butylperoxy)hexyne-3, 2,5-dimethyl-2,5-di(tert-butyl-peroxy)hexane, 2,2'-bis(tert-butylperoxy)-p-diisopropylbenzene, dicumyl peroxide, di-tert-butyl peroxide, tert-butyl peroxybenzoate, 1,1-bis(tert-butylperoxy)-3,3,5-trimethylcyclohexane, 2,4-dichlorobenzoyl peroxide, benzoyl peroxide, p-chlorobenzoyl peroxide, etc. Preferably, an organic peroxide of higher decomposition temperature is selected and used. In adding the organic peroxide, it is preferable to add a monoolefin copolymer rubber of an organic peroxide to a master batch.

The amount of the organic peroxide added is 0.3-1.5 parts by weight, preferably 0.5-1.0 part by weight per 100 parts by weight of the component (N).

When the amount of the organic peroxide added is more than 0.3 part by weight, the component (N) has a high crosslinking density and the resulting composition has excellent mechanical strengths. When the addition amount is more than 1.5 parts by weight, the component (N) has too high a crosslinking density and the composition has a reduced elongation.

In the crosslinking of the component (N), it is possible to use, as a co-crosslinking agent, an alkenyl compound monomer of bifunctionality or higher functionality or the like. Such a co-crosslinking agent includes the following compounds: ethylene dimethacrylate, 1,3-butylene dimethacrylate, 1,4-butylene dimethacrylate, 1,6-hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, trimethylolpropane triacrylate, pentaerythritol triacrylate, divinylbenzene, N,N'-methylenebisacrylamide, p-quinone dioxime, p,p'-dibenzoylquinone dioxime, m-phenylenebismaleimide, 4,4'-diphenylmethanebismaleimide, etc.

The thermoplastic elastomer composition of this invention can comprise auxiliary additives conventionally used in rubbers and resins. Such auxiliary additives are the following commercially available ones: softening agents and plasticizers used for rubbers; fillers such as carbon black, white carbon, clay, talc, calcium carbonate and the like; antioxidant; heat stabilizer; ultraviolet absorber; coloring agent; processing aid; lubricant; etc.

Production of the composition of this invention can be effected by melt-mixing given amounts of an olefin resin (M) and a hydrogenated diene block copolymer (N) by means of a preheated roll mill, a closed type kneader (e.g. Banbury mixer, pressure type kneader) or an extruder and simultaneously allowing a crosslinking agent to act. In a preferable production method, an olefin resin (M) and a hydrogenated diene block copolymer (N) are melt-mixed in a kneader; when the melt-kneading has been completed, a crosslinking agent is added; then, the components (M) and (N) are reacted while dispersing the crosslinking agent.

Alternatively, the hydrogenated diene block copolymer (N) is partially crosslinked in the presence of a part of the olefin resin (M), then the remainder of the olefin resin (M) is added, and kneading is conducted.

The polar resin (III) used in this invention, when it is a thermoplastic resin, includes ABS resin; acrylic resin; polyacrylamide; polyacrylic acid; polyalkyl acrylates such as polymethyl acrylate, polyethyl acrylate and the like; polyacrylonitrile; acrylonitrile-styrene copolymer; polymethacrylamide; polymethacrylic acid; polyalkyl methacrylates such as polymethyl methacrylate, polyethyl methacrylate and the like; polymethacrylonitrile; acetal resin; polyoxymethylene; ionomer; chlorinated polyethylene; coumarone-indene resin; regenerated cellulose; petroleum resins; cellulose derivatives; alkali celluloses; cellulose esters; cellulose acetate; cellulose acetate butyrate; cellulose xanthate; cellulose nitrate; cellulose ethers; carboxymethyl cellulose; cellulose ether esters; fluoroplastics; FEP; polychlorotrifluoroethylene; polytetrafluoroethylene; polyvinylidene fluoride; polyvinyl fluoride; aliphatic polyamides such as nylon 6,10, nylon 6,12, nylon 6,6, nylon 4,6 and the like; aromatic polyamides such as polyphenyleneisophthalamide, polyphenyleneterephthalamide, polymetaxyleneamide and the like; polyimides; polyphenylene sulfide; polyetheretherketones; polyamideimides; polyarylates; polyethylene terephthalate; polyvinylidene chloride; polyvinyl chloride; chlorinated polyethylene; chlorosulfonated polyethylene; polycarbonates; polysulfone; polyethersulfones; polysulfonamide; polyvinyl alcohol; polyvinyl esters; polyvinyl cinammate; polyvinyl acetate; polyvinyl ether; polyisobutyl vinyl ether; polymethyl vinyl ether; polyphenylene oxide; polybutylene terephthalate; etc. The polar resin (III), when it is a thermosetting resin, includes amino resin, aniline resin, urea resin, polysulfonamide, melamine resin, allyl resin, diallyl phthalate resin, alkyd resin, epoxy resin, silicone resin, vinyl ester resin, phenolic resin, novolac resin, resorcinol resin, unsaturated polyester resin, low-shrinkage unsaturated polyester, furan resin, etc. Of these polar resins (III), preferable are polyamide, polyacetal, polyethylene terephthalate, polybutylene terephthalate, polycarbonate, polysulfone, polyphenylene oxide, epoxy resin and phenolic resin.

The proportion of the modified hydrogenated diene block copolymer (I) of this invention/the polar resin (III) is 1-99% by weight/99-1% by weight. In order for the component (III) to be sufficiently modified by the addition of the component (I), the proportion of the component (I) is preferably 3-60% by weight, more preferably 5-50% by weight. When the proportion of the component (I) is too low, no sufficient modification is obtained and, when the proportion is too high, the inherent properties of the component (III) are sacrificed.

The composition of the (modified) hydrogenated diene block copolymer (I) and the thermoplastic polar resin (III) described first. The (modified) hydrogenated diene block copolymer (I) of this invention, when added to the thermoplastic polar resin (III), gives a composition wherein the mechanical strengths and impact resistance of the resin (III) are well improved and which has excellent appearance of molded article.

The above composition of this invention shows a higher modification effect than compositions using, as a modifier for thermoplastic polar resin (III), conventional styrene-butadiene random copolymer, styrene-butadiene block copolymer, polybutadiene or the like.

Blending the (modified) hydrogenated diene block copolymer (I) of this invention into, for example, a thermoplastic polyester gives an improvement in peeling resistance, to the polyester. Blending the copolymer (I) into a polyamide gives low reduction in heat resistance. Blending into a polyphenylene sulfide gives a composition of good processability.

Production of a composition of an unmodified hydrogenated diene block copolymer (I) and a thermoplastic polar resin (III) is preferably effected by compatibilization of the two components using, if necessary, a compatibilizing agent, in view of the impact resistance of the composition and its appearance of molded article. However, in producing a composition of a modified hydrogenated diene block copolymer and a thermoplastic polar resin (III), the above compatibilization is unnecessary because the former shows good compatibility with the latter.

The method of compatibilization includes a method wherein at the time of kneading an unmodified hydrogenated diene block copolymer (I) and a polar resin (III), there are added an unsaturated compound having at least one functional group selected from the group consisting of acid anhydride group, carboxyl group, hydroxyl group, amino group, epoxy group, oxazolyl group and imido group and, as necessary, a peroxide; a method wherein the above-mentioned functional group-containing unsaturated compound and a peroxide are added to a hydrogenated diene block copolymer (I), they are heat-treated to graft the unsaturated compound onto the hydrogenated diene block copolymer, the resulting graft copolymer is blended with a thermoplastic polar resin (III); and a method wherein other polymer having the above-mentioned functional group is used as a compatibilizing agent.

Said unsaturated compounds having at least on functional group include unsaturated acid anhydrides such as maleic anhydride, itaconic anhydride and the like; unsaturated acids such as acrylic acid, methacrylic acid and the like; epoxy group-containing unsaturated compounds such as glycidyl methacrylate, allyl glycidyl ether and the like; amino group-containing unsaturated compounds and their substitution derivatives such as p-aminostyrene, acrylamide and the like; hydroxyl group-containing unsaturated compounds such as hydroxyethyl acrylate and the like; maleimide compounds such as cyclohexylmaleimide, phenylmaleimide and the like; oxazolyl group-containing unsaturated compounds such as vinyloxazoline and the like; etc.

The said other polymer having particular functional group is a random, block or graft copolymer of the above-mentioned functional group-containing unsaturated compound and other vinyl monomer copolymerizable therewith.

Specific examples of the said other copolymer having a particular functional group include copolymers of styrene, the above-mentioned functional group-containing unsaturated compound and, as necessary, at least one other vinyl monomer copolymerizable with them, such as styrene-glycidyl methacrylate copolymer, styrene-maleic anhydride copolymer, styrene-methacrylic acid copolymer, styrene-acrylonitrile-methacrylic acid copolymer and the like. Other examples of the said other copolymer having a particular functional group include copolymers of ethylene, the functional group-containing unsaturated compound and, as necessary, at least one other vinyl monomer copolymerizable with them, such as ethylene-glycidyl methacrylate copolymer, ethylene-glycidyl methacrylate-vinyl acetate copolymer and the like, as well as graft copolymers obtained by grafting such an ethylene copolymer with other polymer. The said other polymer used for grafting include polymers obtained by polymerizing radical-polymerizable vinyl monomers, such as polyalkyl (meth)acrylate, polystyrene, styrene-acrylonitrile copolymer, styrene-alkyl (meth)acrylate copolymer and the like, as well as polymers obtained by copolymerizing the above monomers with the functional group-containing unsaturated compound.

The copolymer as a compatibilizing agent further includes copolymers of butadiene, the functional group-containing unsaturated compound and, as necessary, other vinyl monomer copolymerizable with them, their hydrogenation products, and graft copolymers obtained by grafting said butadiene copolymer with other polymer as mentioned above.

When also in the production of a composition of a modified hydrogenated diene block copolymer (I) and a thermoplastic polar resin (III) there is used the above-mentioned compatibilization method, i.e. the method wherein an unsaturated compound having a particular functional group and, as necessary, a peroxide are added at the time of kneading, or the method wherein a compatibilizing agent is added, the resulting composition has further improved compatibility and properties.

The amount of the compatibilizing agent used is preferably 0.01-400 parts by weight, more preferably 0.1-100 parts by weight per 100 parts by weight of a total of the resin and the hydrogenated diene block copolymer. When the amount is less than 0.01 part by weight, no sufficient compatibilization effect can be obtained. When the amount is more than 400 parts by weight, the resulting composition has reduced properties.

To the composition of the (modified) hydrogenated diene block copolymer (I) of this invention and the thermoplastic polar resin (III) can be added, besides the compatibilizing agent, other rubbery polymer. The rubbery polymer includes polybutadiene, acrylonitrile-butadiene copolymer, its hydrogenation product, ethylene-α-olefin copolymer, ethylene-α-olefin-polyene copolymer, polyacrylic acid ester, styrene-butadiene block copolymer, hydrogenated styrene-butadiene block copolymer, ethylene-propylene elastomer grafted with styrene, ethylenic ionomer, etc. These rubbery polymers can be used alone or in admixture of two or more.

The styrene-butadiene block copolymer includes ABA type, ABA tapered type, radial tereblock type, etc.

The composition of the modified hydrogenated diene blcok copolymer (I) of this invention and the thermoplastic polar resin (III) can be obtained by kneading the two components preferably at a temperature of 200°-350° C. using an extruder, a Banbury mixer, a kneader, rolls or the like.

The kneading can be effected in one stage, or in multi-stage in which either of the components is kneaded first and then the remainder of the components is added thereto and kneaded therewith.

In kneading, preferably, a continuous kneader and an extruder are used in combination, or an extruder alone is used. As the extruder, a screw unidirectionally rotating extruder is particularly preferable.

To the thermoplastic resin composition comprising the (modified) hydrogenated diene block copolymer (I) of this invention and the thermoplastic polar resin (II) can be added, alone or in combination of two or more, known fillers such as glass fiber, carbon fiber, metal fiber, glass beads, asbestos, mica, calcium carbonate, potassium titanate whiskers, talc, aramid fiber, barium sulfate, glass flakes, fluoroplastic and the like.

The glass fiber and the carbon fiber preferably have a fiber diameter of 6-60 $\mu$m and a fiber length of 30 $\mu$m or more.

These fillers are added in an amount of preferably 5-150 parts by weight per 100 parts by weight of the thermoplastic resin composition, in order to obtain the addition effect.

To the thermoplastic resin composition can further be added other known additives such as antioxidant, plasticizer, coloring agent, lubricant and the like. Furthermore, other known polymers can be added depending upon the properties required for the composition.

The thermoplastic resin composition of this invention comprising the component (I) and the component (III) can be formed into various molded articles by injection molding, sheet extrusion, vacuum molding, profile molding, foam molding, etc.

The molded articles obtained by the above molding methods can be used as a material for automobile exterior or interior parts, electric or electronic parts, housings, etc. for their excellent properties.

The thermoplastic resin composition comprising
(a) 1-90% by weight of at least one of the (modified) hydrogenated diene block copolymers of this invention
(b) 5-94% by weight of a thermoplastic polyester and/or a thermoplastic polyester elastomer [hereinafter referred to as "component (b)"] and (c) 5-94% by weight of other thermoplastic polymer [hereinafter referred to as "component (c)"], is a thermoplastic resin composition having excellent impact resistance and giving molded articles of excellent appearance and properties.

The amount of the component (a) used in the above thermoplastic resin composition is 1-90% by weight, preferably 1-80% by weight, more preferably 5-80% by weight, particularly preferably 5-70% by weight. When the amount is less than 1% by weight, the resulting composition has no improvement in impact resistance. When the amount is more than 90% by weight, the composition has poor impact resistance and appearance of molded article.

The thermoplastic polyester used in the component (b) includes, for example, fully aromatic polyesters obtained by condensation polymerization of (1) an aromatic dicarboxylic acid or its derivative and (2) an aromatic diol or its derivative, and aromatic polyesters obtained by condensation polymerization of (1) an aromatic dicarboxylic acid or its derivative and (2) an aliphatic diol. The aromatic polyesters are preferable.

Preferably, the aromatic polyesters are polymers or copolymers obtained by condensation of terephthalic acid and an alkylene glycol. Particularly preferably, the aromatic polyesters are polybutylene terephthalate and polyethylene terephthalate, and their molecular weights are preferably such that the intrinsic viscosities as measured at 30° C. using o-chlorophenol as a solvent are 0.2-2.0 dl/g.

The thermoplastic polyester elastomer in the component (b) has a high-melting crystalline segment (X) consisting of an aromatic polyester unit and a low-melting polymer segment (Y) consisting mainly of an aliphatic polyether or aliphatic polyester unit.

The weight ratio of (X)/(Y) in the thermoplastic polyester elastomer is 10-95/90-5.

The high-melting crystalline segment (X) consists of at least one dicarboxylic acid having a molecular weight of less than 300 and at least one alkylene glycol or cycloalkylene glycol having a molecular weight of less than 300.

The low-melting polymer segment (Y) consists of at least one long-chain glycol alone having a molecular weight of 400–6,000, or of at least one said long-chain glycol and at least one dicarboxylic acid having a molecular weight of less than 300.

The component (b) can be replaced by (b') a thermoplastic polyamide and/or a thermoplastic polyamide elastomer.

The thermoplastic polyamide is, for example, a polyamide ordinarily obtained by condensation of (1) a linear diamine represented by $H_2N-(CH_2)_x-NH_2$ (x is an integer of 4–12) and (2) a linear dicarboxylic acid represented by $HOOC-(CH_2)_y-COOH$ (y is an integer of 2–12) and a polyamide obtained by ring-opening polymerization of lactam. Preferable examples of these polyamides are nylon 6,6, nylon 6,9, nylon 6,10, nylon 6,12, nylon 6, nylon 12, nylon 11, nylon 4,6, etc.

There can also be used copolymeric polyamides such as nylon 6/6,6, nylon 6/6,10, nylon 6/12, nylon 6,12, nylon 6/6,6/6,10, nylon 6/6,6/12 and the like.

The polyamide elastomer used as the component (b') can be an elastomer synthesized by a condensation reaction between a polyamide and a polyether having a hydroxyl group at the chain terminal.

The polyether having a hydroxyl group at the chain terminal can be a straight chain or branched chain polyoxyalkylene glycol (e.g. polyoxyethylene glycol, polyoxypropylene glycol, polyoxytetramethylene glycol], their mixture, or a copolyether derived from the polyoxyalkylene glycol. The average molecular weight of the polyether is generally 200–6,000, preferably 400–3,000.

The amount of the polyoxyalkylene glycol in the total components is usually 5–85% by weight, preferably 10–50% by weight.

The polyamide includes a lactam whose hydrocarbon chain has 4–14 carbon atoms and an amino acid condensation product.

(b") A polyphenylene ether can be used in place of the component (b).

Specific examples of the polyphenylene ether are particularly preferably a polymer obtained from 2,6-dimethylphenol, and a copolymer obtained from 2,6-dimethylphenol and 2,3,6-trimethylphenol.

The intrinsic viscosity $[\eta]$ of the polyphenylene ether (b") as measured at 30° C. in chloroform is not critical but is preferably 0.2 dl/g, more preferably 0.25–0.7 dl/g.

The other thermoplastic polymer (c) is a thermoplastic resin, thermoplastic elastomer or rubbery polymer other than mentioned above. The component (c) is preferably a thermoplastic resin.

The amount of the component (c) used is preferably 5–94% by weight, more preferably 10–90% by weight based on the total amount of the components (a) to (c). When the amount is 5% by weight or more, the resulting composition has excellent heat resistance, but when the amount is more than 94% by weight, the resulting composition is inferior in impact resistance, surface appearance of molded article and moldability.

In the above composition, the total amount of the components (b) and (c) used is 99–10% by weight, preferably 99–20% by weight, more preferably 95–30% by weight. When the total amount is more than 99% by weight, the resulting composition is inferior in impact resistance. By making the total amount 10% by weight or more, there can be obtained a composition having excellent impact resistance and surface appearance of molded article.

The ratio of the component (b)/the component (c) is preferably 90–10% by weight/10–90% by weight, more preferably 80–20% by weight/20–80% by weight, particularly preferably 70–30% by weight/30–70% by weight.

To the above thermoplastic resin composition can be applied the same compatibilization method as mentioned above concerning the composition of the unmodified hydrogenated diene block copolymer (I) and the thermoplastic polar resin (III), for improving the compatibility.

For the purpose of improvement of compatibility and/or properties, there may be added to the composition at the time of its production, the same unsaturated compound having a functional groups as mentioned above in combination, as necessary, with an organic peroxide.

Preferable results are obtained in some cases when a crosslinking agent ordinarily used in rubbers is added to the above composition at the time of its production in order to crosslink the rubbery polymers used as the components (a), (b), etc.

The crosslinking agent can be an organic peroxide alone; its combination with a crosslinking aid such as bismaleimide crosslinking aid, dimethacrylic crosslinking aid, diallyl crosslinking aid, trimethacrylic crosslinking aid, oxime compound or the like; sulfur alone; a sulfur-containing organic compound alone (e.g. tetramethylthiuram disulfide); its combination with a vulcanization accelerator; etc.

The above thermoplastic resin composition can be formed into various molded articles by injection molding, sheet molding, vacuum molding, profile molding, foam molding, blow molding, stampable molding, etc.

The molded articles can be used as a material for automobile exterior or interior parts, electric or electronic parts, housings, etc., for their excellent properties.

Next, a description is made on the composition comprising the (modified) hydrogenated diene block copolymer (I) of this invention and a thermosetting polar resin (III). The (modified) hydrogenated diene block copolymer (I) of this invention, when blended with a thermosetting polar resin (III), can give a composition retaining the excellent strength and impact resistance possessed by the resin (III) and further having excellent heat resistance and electrical insulation. This composition is highly improved as compared with conventionally used acrylonitrile-butadiene rubber, carboxyl group-containing acrylonitrile-butadiene rubber, etc.

When in production of a composition of the (modified) hydrogenated diene block copolymer (I) and the thermosetting polar resin (III), there is used a modified hydrogenated diene block copolymer as the component (I), the resulting composition has excellent compatibility and exhibits the effects as intended by this invention, at a higher level. Therefore, a modified hydrogenated diene block copolymer is preferable as the component (I). The functional group-containing unsaturated compound used as a graft monomer (a modifying agent) in the production of the modified hydrogenated diene block copolymer, is preferably an acid anhydride group- or carboxyl group-containing unsaturated compound because it can be easily grafted. An acid anhydride group-containing compound is particularly preferable because this compound is widely used as a curing agent for thermosetting resins such as epoxy resin and the like and, even if partially remains unreacted, it gives no adverse effect on thermosetting resins.

Mixing the (modified) hydrogenated diene block copolymer (I) with the thermosetting polar resin (III) has no restriction, and it can be effected using a closed type mixer (e.g. Banbury mixer), rolls, an extruder or the like depending upon the mixing ratio of the component (I)/the component (III).

The composition of the (modified) hydrogenated diene block copolymer (I) of this invention and the thermosetting polar resin (III) can comprise, as necessary, an antioxidant, a stabilizer, a plasticizer, a softening agent, inorganic and organic fillers, a reinforcing agent, a crosslinking agent, etc.

The composition comprising, as main components, the (modified) hydrogenated diene block copolymer (I) of this invention and the thermosetting polar resin (III) is widely used mainly in electronic parts, and also in coating material, casting material, molding material, adhesive, paint, etc.

In the above description, the composition of the (modified) hydrogenated diene block copolymer (I) and a resin has been explained referring to the composition of the component (I) and the non-polar resin (II) and the composition of the component (I) and the polar resin (III). However, the composition of this invention includes also a composition of the component (I), the component (II) and the component (III).

This invention is described in more detail referring to Examples. However, this invention is not restricted to these Examples.

In the Examples, parts and % are by weight unless otherwise specified. Various properties as mentioned in the Examples were measured by the following methods.

Bound styrene content was measured by an infrared analysis, based on the phenyl group absorption at 679 $cm^{-1}$.

Vinyl content was calculated according to the Hampton method using an infrared analysis.

Hydrogenation degree was calculated from the $^1H$-NMR spectrum obtained at 100 MHz using tetrachloroethylene as a solvent.

Molecular weight was obtained as a polystyrene-reduced molecular weight, by gel permeation chromatography at 135° C. using trichlorobenzene as a solvent.

Melt flow rate was measured at 230° C. under a load of 12.5 kg, 5 kg or 2.16 kg in accordance with JIS K 7210.

Blocking tendency of pellets was measured by preparing round pellets using a 55-mmΦ single-screw extruder and a hot cutter, placing them in a constant temperature bath of 40° C. under a load of 30 $g/cm^2$ for 24 hours to allow them to stick to each other and form blocks, and rating the blocks as follows.

⊚: Blocks can be disintegrated very easily.
○: Blocks can be disintegrated relatively easily.
x: Blocks are difficult to disintegrate.

Izod impact strength was measured according to JIS K 7110, using an injection-molded article with notch.

Izod impact strength after thermal ageing was measured by placing an injection-molded article with notch in a Geer oven set at 150° C., for 120 hours or 70 hours, then cooling the article to room temperature and subjecting the article to the above test according to JIS K 7110.

Flexural modulus was measured in accordance with JIS K 7203.

Surface gloss was measured in accordance with JIS K 7105.

Film peeling strength was measured by degreasing a 2-mm thick sheet obtained by injection molding, with ethanol, subjecting the sheet to a surface treatment by trichloroethane vapor, coating the resulting sheet first with a primer (RB291H manufactured by Nihon B Chemical K.K.) and then with a polyurethane type paint (R263 manufactured by the same company) so that the film thickness (as dried) of the paint became about 50 microns, and after the film has been cured, peeling the film at 180° C. at a drawing speed of 30 mm/min.

Amount of functional group-containing unsaturated compound (modifying monomer) added was measured by examining $\gamma_{C=O}$ (stretching vibration of carboxyl group) using the calibration curve method by infrared absorption spectrum.

Appearance of molded article was evaluated visually in accordance with the following rating standard.

○: Appearance is good.
x: Has poor appearance as represented by iridescent luster, flow marks, surface roughening, etc.

Tensile strength ($T_B$) was obtained by measuring a breaking strength ($kg.f/cm^2$) at a drawing speed of 500 m/min using a JIS No. 3 dumbbell.

Tensile elongation ($T_E$) was obtained by measuring an elongation (%) up to breakage under the same test conditions as used for the above tensile strength.

Thermal ageing resistance was obtained by allowing a JIS No. 3 dumbbell to stand in a Geer oven at 110° C. for 168 hours and then subjecting the resulting dumbell to measurement of tensile strength ($T_B$) and tensile elongation ($T_E$).

Hardness was measured as a JIS hardness.

Tension set was obtained by stretching a JIS No. 3 dumbbell by 100%, maintaining the condition for 10 minutes, then measuring the length after 10 minutes, and calculating the tension set. A larger tension set indicates that the product is inferior in properties as thermoplastic elastomer.

Transparency was obtained by visually evaluating the transparency of a molded article (JIS No. 3 dumbbell) according to the following rating standard.

○: Good transparency.
Δ: Translucent.
x: Opaque.

Volume resistivity was measured in accordance with ASTM D 257-61.

EXAMPLE 1 (PREPARATION OF HYDROGENATED DIENE BLOCK COPOLYMER P-1)

Into a 5-liter autoclave were fed 2,500 g of degassed and dehydrated cyclohexane and 50 g of styrene. Thereto were added 9.8 g of tetrahydrofuran and 0.2 g of n-butyllithium. The mixture was subjected to isothermal polymerization at 50° C. (first-stage polymerization). When the conversion reached 100%, further polymerization was conducted at 70° C. while continuously adding a mixture of 350 g of 1,3-butadiene and 100 g of styrene at a rate of 75 g per 10 minutes (second-polymerization stage).

Sampling was made at intervals of 10 minutes in the course of the polymerization and the polymers formed at each sampling timing were measured for bound styrene content and micro structure of 1,3-butadiene.

When the conversion of the monomers added reached approximately 100%, the reaction mixture was cooled to 70° C. Thereto were added 0.6 g of n-butyllithium, 0.6 g of 2,6-tert-butyl-p-cresol, 0.28 g of bis(cyclopentadienyl)titanium dichloride and 1.1 g of diethylaluminum chloride. The resulting mixture was subjected to reaction for 1 hour with the reaction pressure being maintained at 10.0 kg/cm$^2$ with hydrogen gas.

The reaction mixture was cooled to room temperature, taken out of the autoclave, subjected to steam stripping to remove the solvent, and dried on a 120° C. roll, to obtain a hydrogenated diene block copolymer (hereinafter referred to as Copolymer P-1).

The resulting hydrogenated diene block copolymer was measured for properties in accordance with the above-mentioned test methods. As a result, the total bound styrene content in the copolymer before hydrogenation was 30% by weight, the bound styrene content in the polymer block obtained in the first-stage polymerization was 100% by weight, and from the monomer conversion and the amount of the finally obtained copolymer, the proportion of the bound styrene content of the polymer block obtained in the first-stage polymerization in the final copolymer before hydrogenation was calculated to be 10% by weight. The polymer block formed in the first-stage polymerization is referred to as Block (A).

Successive analysis indicated that the second-stage polymerization proceeded so that the reaction product at each sampling timing had a constant styrene/1,3-butadiene ratio. Measurement by GPC indicated that with the proceeding of the reaction the molecular weight of polymer increased gradually without partial formation of low-molecular polymer and the living reaction proceeded as desired. The vinyl content of this 1,3-butadiene portion was found to be 40% by analysis. The polymer portion formed in the second stage polymerization is referred to as Block (B).

By analyzing the amount of the residual double bond in the conjugated diene portion in Copolymer P-1, the hydrogenation degree of Copolymer P-1 was found to be 98%.

The hydrogenated diene block copolymer had a molecular weight of 150,000 and a melt flow rate of 40 g/10 min at 230° C. under a load of 5 kg.

EXAMPLE 2 (PREPARATION OF HYDROGENATED DIENE BLOCK COPOLYMER P-2)

The same procedure as in Example 1 was repeated, except that the following polymerization recipes were used, to obtain a hydrogenated diene block copolymer (hereinafter referred to as Copolymer P-2).
First-stage polymerization
Styrene: 25 g
Tetrahydrofuran: 9.8 g
Second-stage polymerization
Styrene: 50 g
1,3-Butadiene: 425 g
The properties of Copolymer P-2 are shown in Table 1.

EXAMPLE 3 (PREPARATION OF HYDROGENATED DIENE BLOCK COPOLYMER P-3)

The same procedure as in Example 1 was repeated, except that the following polymerization recipes were used, to obtain a hydrogenated diene block copolymer (hereinafter referred to as Copolymer P-3).
First-stage polymerization
Styrene: 50 g
Tetrahydrofuran: 3 g
Second-stage polymerization
Styrene: 100 g
1,3-Butadiene: 350 g
The properties of Copolymer P-3 are shown in Table 1.

EXAMPLE 4 (PREPARATION OF HYDROGENATED DIENE BLOCK COPOLYMER P-4)

The same procedure as in Example 1 was repeated, except that the following polymerization recipes were used, to obtain a hydrogenated diene block copolymer (hereinafter referred to as Copolymer P-4).
First-stage polymerization
Styrene: 100 g
Tetrahydrofuran: 9.8 g
Second-stage polymerization
Styrene: 75 g
1,3-Butadiene: 325 g
The properties of Copolymer P-4 are shown in Table 1.

COMPARATIVE EXAMPLE 1 (PREPARATION OF HYDROGENATED DIENE BLOCK COPOLYMER P-5)

First-stage polymerization
Styrene: 150 g
1,3-Butadiene: 350 g
Tetrahydrofuran: 9.8 g
Only the first-stage polymerization was effected, followed by the same hydrogenation reaction as in Example 1, to obtain a hydrogenated diene copolymer (hereinafter referred to as Copolymer P-5).
The properties of Copolymer P-5 are shown in Table 1.

COMPARATIVE EXAMPLE 2 (PREPARATION OF HYDROGENATED DIENE BLOCK COPOLYMER P-6)

The same procedure as in Example 1 was repeated, except that the hydrogen gas pressure during the hydrogenation reaction was changed to 5 kg/cm$^2$, to obtain a hydrogenated diene block copolymer (hereinafter referred to as Copolymer P-6).
The properties of Copolymer P-6 are shown in Table 1.

COMPARATIVE EXAMPLE 3 (PREPARATION OF HYDROGENATED DIENE BLOCK COPOLYMER P-7)

First-stage polymerization
Styrene: 75 g
Tetrahydrofuran: 10 g
Second-stage polymerization
1,3-Butadiene: 350 g
A hydrogenated diene block copolymer (hereinafter referred to as Copolymer P-7) was obtained by repeating the same procedure as in Example 1, except that the above polymerization recipes were used and, when the conversion in the second-stage polymerization reached approximately 100%, 75 g of additional styrene was added and adiabatic polymerization was effected. The properties of Copolymer P-7 are shown in Table 1.

The copolymers prepared in Examples 1–4 which are the hydrogenated diene block copolymers of this invention, cause no blocking in pelletization and, when blended with other resins, give modification effects as intended in this invention, as shown in Example 5 et seq.

Meanwhile, Copolymer P-5 of Comparative Example 1 causes blocking between pellets. Copolymers P-6 and P-7 of Comparative Examples 2 and 3 cause no blocking between pellets but, as shown in Comparative Example 5 et seq., give modification effects inferior to those of the hydrogenated diene block copolymers of Examples 1 to 4 when blended with other resins.

EXAMPLE 6 (PREPARATION OF HYDROGENATED DIENE BLOCK COPOLYMER Q-2)

Into a 10-liter autoclave were fed 5,000 g of degassed and dehydrated cyclohexane, 900 g of 1,3-butadiene and 60 g of styrene. Thereto were added 200 g of tetrahydrofuran and 0.3 g of n-butyllithium, and adiabatic polymerization was effected starting from 10° C. After 45 minutes, 40 g of styrene was added and further polymerization was effected. Then, hydrogenation was effected in the same manner as in Example 5.

The resulting hydrogenated polymer (hereinafter referred to as Copolymer Q-2) has a hydrogenation degree of 97%, a polystyrene-reduced number-average molecular weight of 310,000 and a melt flow rate of 2.3 g/10 min as measured at 230° C. under a load of 12.5 kg.

The vinyl content of the butadiene portion of the

TABLE 1

|   | Example |  |  |  | Comparative Example |  |  |
|---|---|---|---|---|---|---|---|
|   | 1 | 2 | 3 | 4 | 1 | 2 | 3 |
| Hydrogenated diene block copolymer | Copolymer P-1 | Copolymer P-2 | Copolymer P-3 | Copolymer P-4 | Copolymer P-5*[1] | Copolymer P-6 | Copolymer P-7*[2] |
| Micro structure |  |  |  |  |  |  |  |
| ① Total bound styrene content (%) | 30 | 15 | 30 | 35 | 30 | 30 | 30 |
| ② Proportion of bound styrene content of Block (A) in total copolymer (%) | 10 | 5 | 10 | 20 | — | 10 | (30) |
| ③ Vinyl content of butadiene portion in Block (B) (%) | 40 | 40 | 20 | 40 | 40 | 40 | 40 |
| Properties of copolymer |  |  |  |  |  |  |  |
| ① Hydrogenation degree (%) | 98 | 96 | 97 | 98 | 97 | 79 | 98 |
| ② Molecular weight ($\times 10^{-4}$) | 15 | 17 | 15 | 16 | 17 | 15 | 10 |
| ③ Melt flow rate (230° C., 5 Kg) | 40 | 35 | 33 | 30 | 28 | 37 | 3 |
| ④ Blocking tendency of pellets | ⊚ | ○ | ⊚ | ⊚ | X | ⊚ | ⊚ |

Note:
*[1]Hydrogenation product of styrene-1,3-butadiene random copolymer.
*[2]Hydrogenation product of polystyrene-polybutadiene-polystyrene triblock copolymer.

polymer before hydrogenation was 80%.

EXAMPLE 5 (PREPARATION OF HYDROGENATED DIENE BLOCK COPOLYMER Q-1)

Into a 10-liter autoclave were fed 5,000 g of degassed and dehydrated cyclohexane and 950 g of 1,3-butadiene. Thereto were added 200 g of tetrahydrofuran and 0.3 g of n-butyllithium, and adiabatic polymerization was effected starting from 10° C. After 45 minutes, 50 g of styrene was added and further polymerization was effected.

The reaction mixture was controlled at 70° C. and there were added 1.5 g of n-butyllithium and 1.5 g of 2,6-di-tert-butyl-p-cresol, followed by addition of 0.5 g of bis(cyclopentadienyl)titanium dichloride and 2 g of diethylaluminum chloride. The resulting mixture was hydrogenated at a hydrogen pressure of 10 kg/cm² for 1 hour.

The reaction mixture was returned to an atmosphere of room temperature and atmospheric pressure, taken out of the autoclave, and poured into water with stirring. The solvent was removed by steam distillation to obtain a hydrogenated polymer (hereinafter referred to as Copolymer Q-1). This hydrogenated polymer had a hydrogenation degree of 98%, a polystyrene-reduced number-average molecular weight of 295,000 and a melt flow rate of 2.0 g/10 min as measured at 230° C. under a load of 12.5 kg.

The vinyl content of the butadiene portion of the polymer before hydrogenation was 81%.

EXAMPLE 7 (PREPARATION OF HYDROGENATED DIENE BLOCK COPOLYMER Q-3)

Into a 10-liter autoclave were fed 5,000 g of degassed and dehydrated cyclohexane and 150 g of styrene. Thereto were added 200 g of tetrahydrofuran and 0.3 g of n-butyllithium, and adiabatic polymerization was effected for 30 minutes starting from 50° C. The reaction mixture was cooled to 10° C. 600 g of 1,3-butadiene was added and polymerization was effected. Then, 90 g of styrene and 90 g of 1,3-butadiene were added and polymerization was effected again.

Thereafter, hydrogenation was effected in the same manner as in Example 5.

The resulting hydrogenated polymer (hereinafter referred to as Copolymer Q-3) had a hydrogenation degree of 98%, a polystyrene-reduced number-average molecular weight of 289,000 and a melt flow rate of 1.3 g/10 min as measured at 230° C. under a load of 12.5 kg.

The vinyl content of the butadiene portion of the polymer before hydrogenation was 77%.

EXAMPLE 8 (PREPARATION OF HYDROGENATED DIENE BLOCK COPOLYMER Q-4)

Into a 10-liter autoclave were fed 5,000 g of degassed and dehydrated cyclohexane and 40 g of styrene. Thereto were added 200 g of tetrahydrofuran and 0.3 g of n-butyllithium. The resulting mixture was subjected to adiabatic polymerization for 30 minutes starting from 50° C. The reaction mixture was cooled to 10° C., and 600 g of 1,3-butadiene and 170 g of styrene were added. The resulting mixture was subjected to polymerization. 95 g of styrene and 95 g of 1,3-butadiene were further added, and the polymerization was continued. Then, the reaction mixture was subjected to the same hydrogenation reaction as in Example 5.

The resulting hydrogenated polymer (hereinafter referred to as Copolymer Q-4) had a hydrogenation degree of 98%, a polystyrene-reduced number-average molecular weight of 292,000 and a melt flow rate of 1.2 g/10 min as measured at 230° C. under a load of 12.5 kg.

The vinyl content of the butadiene portion of the copolymer before hydrogenation was 78%.

EXAMPLE 9 (PREPARATION OF HYDROGENATED DIENE BLOCK COPOLYMER Q-5)

Into a 10-liter autoclave were fed 5,000 g of degassed and dehydrated cyclohexane and 100 g of styrene. Thereto were added 150 g of tetrahydrofuran and 0.8 g of n-butyllithium. The resulting mixture was subjected to adiabatic polymerization for 30 minutes starting from 50° C. The reaction mixture was cooled to 10° C. 700 g of 1,3-butadiene was added and polymerization was effected. Then, 100 g of styrene was added and polymerization was effected. The reaction mixture was subjected to the same hydrogenation reaction as in Example 5.

The resulting hydrogenated copolymer (hereinafter referred to as Copolymer Q-5) had a hydrogenation degree of 98%, a polystyrene-reduced number-average molecular weight of 115,000 and a melt flow rate of 0.7 g/10 min as measured at 230° C. under a load of 12.5 kg.

The vinyl content of the butadiene portion of the copolymer before hydrogenation was 65%.

EXAMPLE 10 (PREPARATION OF HYDROGENATED DIENE BLOCK COPOLYMER Q-6)

Into a 10-liter autoclave were fed 5,000 g of degassed and dehydrated cyclohexane and 125 g of styrene. Thereto were added 200 g of tetrahydrofuran and 0.8 g of n-butyllithium. The mixture was subjected to adiabatic polymerization for 30 minutes starting from 50° C. The reaction mixture was cooled to 10° C. 700 g of 1,3-butadiene and 50 g of styrene were added and polymerization was effected. Further, 125 g of styrene was added and polymerization was effected. The reaction mixture was subjected to the same hydrogenation reaction as in Example 5.

The resulting hydrogenated copolymer (hereinafter referred to as Copolymer Q-6) had a hydrogenation degree of 97%, a polystyrene-reduced number-average molecular weight of 110,000 and a melt flow rate of 1.1 g/10 min as measured at 230° C. under a load of 12.5 kg.

The vinyl content of the butadiene portion of the copolymer before hydrogenation was 77%.

EXAMPLE 11 (PREPARATION OF HYDROGENATED DIENE BLOCK COPOLYMER Q-7)

Into a 10-liter autoclave were fed 5,000 g of degassed and dehydrated cyclohexane and 150 g of styrene. Thereto were added 200 g of tetrahydrofuran and 0.8 g of n-butyllithium. The resulting mixture was subjected to adiabatic polymerization for 30 minutes starting from 50° C. The reaction mixture was cooled to 10° C. 700 g of 1,3-butadiene was added and polymerization was effected. Further, 150 g of styrene was added and polymerization was effected. Then, the reaction mixture was subjected to the same hydrogenation reaction as in Example 5.

The resulting hydrogenated copolymer (hereinafter referred to as Copolymer Q-7) had a hydrogenation degree of 99%, a polystyrene-reduced number-average molecular weight of 110,000 and a melt flow rate of 2.5 g/10 min as measured at 230° C. under a load of 12.5 kg.

The vinyl content of the butadiene portion of the copolymer before hydrogenation was 85%.

In Table 2, there are shown the physical properties of the hydrogenated copolymers prepared in Examples 5-11. As is clear from Table 2, the hydrogenated diene block copolymers of this invention are pelletizable by themselves and accordingly have excellent processability.

TABLE 2

| | Example | | | | | | |
|---|---|---|---|---|---|---|---|
| | 5 | 6 | 7 | 8 | 9 | 10 | 11 |
| Hydrogenated diene block copolymer | Copolymer Q-1 | Copolymer Q-2 | Copolymer Q-3 | Copolymer Q-4 | Copolymer Q-5 | Copolymer Q-6 | Copolymer Q-7 |
| Micro structure | | | | | | | |
| ① Total bound styrene content (%) | 5 | 10 | 25.8 | 30.5 | 22.2 | 30 | 30 |
| ② Proportion of total bound styrene content of Block (A) in total copolymer (%) | 5 | 4.5 | 24 | 13.5 | 20 | 25 | 30 |
| ③ Vinyl content of butadiene portion in Block (B) (%) | 81 | 80 | 77 | 78 | 65 | 77 | 85 |
| Properties of copolymer | | | | | | | |
| ① Hydrogenation degree (%) | 98 | 97 | 98 | 99 | 98 | 97 | 99 |
| ② Molecular weight ($\times 10^{-4}$) | 29.5 | 31 | 28.9 | 29.2 | 11.5 | 11.0 | 11.0 |
| ③ Melt flow rate (230° C., 12.5 Kg) | 2.0 | 2.3 | 1.3 | 1.2 | 0.7 | 1.1 | 1.1 |
| ④ Easiness of pelletization | ○ | ○ | ○ | ○ | ○ | ○ | ○ |
| ⑤ Blocking tendency of pellets | ○ | ○ | ⊚ | ⊚ | ⊚ | ⊚ | ⊚ |

EXAMPLES 12-20 AND COMPARATIVE EXAMPLES 4-8 (PREPARATION OF COMPOSITIONS OF HYDROGENATED DIENE BLOCK COPOLYMER AND NON-POLAR RESIN)

25 parts of one of the copolymers obtained in Examples 1-8 and 75 parts of a polypropylene resin (Polypropylene BC-2 manufactured by Mitsubishi Petrochemical Co., Ltd.) were melt-kneaded using a 4-liter Banbury mixer.

Nine kinds of the melt-kneaded products were pelletized and then subjected to injection molding to prepare test pieces for measurement of physical properties. The results of measurement of physical properties are shown in Tables 3 and 4.

modulus and surface gloss and show no sufficient resin-modification effect.

TABLE 3

|  | Example | | | | Comparative Example | | | |
| --- | --- | --- | --- | --- | --- | --- | --- | --- |
|  | 12 | 13 | 14 | 15 | 4 | 5 | 6 | 7 |
| Compounding recipe | | | | | | | | |
| Copolymer (I) | | | | | | | | |
| Type | Copolymer P-1 | Copolymer P-2 | Copolymer P-3 | Copolymer P-4 | Copolymer P-6 | Copolymer P-7 | EP[*2] | — |
| Parts | 25 | 25 | 25 | 25 | 25 | 25 | 25 | — |
| Non-polar resin (II) | | | | | | | | |
| Type | PP[*1] | PP[*1] | PP[*1] | PP[*1] | PP[*1] | PP[*1] | PP[*1] | PP[*1] |
| Parts | 75 | 75 | 75 | 75 | 75 | 75 | 75 | 100 |
| Physical properties | | | | | | | | |
| Melt flow rate (230° C., 2.16 kg) (g/10 min) | 12 | 11 | 10 | 9.7 | 12 | 7.1 | 5.0 | 14 |
| Izod impact strength (−40° C.) (kg · cm/cm) | 35 | 30 | 31 | 32 | 27 | 7.1 | 14 | 4.1 |
| Flexural modulus (kg · f/cm$^2$) | 6,600 | 6,500 | 6,500 | 6,900 | 6,400 | 6,300 | 6,200 | 10,300 |
| Surface gloss (incident angle = 60°) (%) | 66 | 65 | 62 | 70 | 36 | 41 | 25 | 63 |

Note:
[*1]Polypropylene resin (Polypropylene BC-2 manufactured by Mitsubishi Petrochemical Co., Ltd.)
[*2]Ethylene-propylene copolymer rubber (JSR EP07P manufactured by Japan Synthetic Rubber Co., Ltd.)

TABLE 4

|  | Example | | | | | Comparative Example |
| --- | --- | --- | --- | --- | --- | --- |
|  | 16 | 17 | 18 | 19 | 20 | 8 |
| Compounding recipe | | | | | | |
| Copolymer (I) | | | | | | |
| Type | Copolymer Q-1 | Copolymer Q-2 | Copolymer Q-3 | Copolymer Q-4 | Copolymer Q-5 | Copolymer P-5 |
| Parts | 25 | 25 | 25 | 25 | 25 | 25 |
| Non-polar resin (II) | | | | | | |
| Type | PP | PP | PP | PP | PP | PP |
| Parts | 75 | 75 | 75 | 75 | 75 | 75 |
| Physical properties | | | | | | |
| Melt flow rate (230° C., 2.16 kg) (g/10 min) | 11.5 | 13.0 | 15.0 | 12.0 | 10.5 | 6.3 |
| Izod impact strength (kg · cm/cm) | | | | | | |
| −20° C. | 13.6 | 12.0 | 13.2 | 14.5 | 12.3 | 10.5 |
| −40° C. | 11.2 | 10.1 | 11.1 | 12.6 | 10.1 | 8.8 |
| Flexural modulus (kg · f/cm$^2$) | 2,370 | 2,500 | 2,800 | 2,400 | 2,600 | 5,050 |
| Surface gloss (incident angle = 60°) (%) | 64 | 45 | 47 | 50 | 52 | 23 |
| Peeling strength of film (g/cm) | 1.5 | 1.4 | 1.4 | 1.7 | 1.6 | 1.1 |

For comparison, one of the copolymers obtained in Comparative Examples 1-3 or an ethylene-propylene copolymer rubber widely used (JSR EP07P manufactured by Japan Synthetic Rubber Co., Ltd.) was subjected to the same melt-kneading with polypropylene as above. Four kinds of the melt-kneaded products and a polypropylene resin alone were treated in the same manner as above to prepare test pieces for measurement of physical properties. The results of measurement of physical properties are shown in Tables 3 and 4.

The compositions of Examples 12-20 are superior in Izod impact strength, flexural modulus and surface gloss.

Meanwhile, the compositions of Comparative Examples 4-8 are inferior in Izod impact strength, flexural

EXAMPLES 21-26 AND COMPARATIVE EXAMPLES 9-11 (PREPARATION OF COMPOSITIONS OF HYDROGENATED DIENE BLOCK COPOLYMER AND POLAR RESIN)

A hydrogenated diene block copolymer, a polar resin and, in some cases, a compatibilizing agent each shown in Table 5 were melt-kneaded by a twin-screw extruder. The resulting melt-kneaded products were pelletized, thoroughly dried and then subjected to injection molding to prepare test pieces for measurement of physical properties. The results of measurement of physical properties are shown in Table 5.

The compositions of Examples 21-26 are superior in impact resistance and surface appearance of molded article. However, the compositions of Comparative Examples 9-11 are insufficient in impact resistance.

TABLE 5

| | Example | | | Comparative Example | Example | | | Comparative Example | |
|---|---|---|---|---|---|---|---|---|---|
| | 21 | 22 | 23 | 9 | 24 | 25 | 26 | 10 | 11 |
| Compounding recipe | | | | | | | | | |
| Copolymer (I) | | | | | | | | | |
| Type | Copolymer P-1 | Copolymer P-2 | Copolymer P-1 | Copolymer P-7 | Copolymer P-1 | Copolymer P-1 | Copolymer P-1 | Copolymer P-7 | — |
| Parts | 20 | 20 | 20 | 20 | 20 | 20 | 20 | 20 | — |
| Polar resin (III) | | | | | | | | | |
| Type | Nylon 6 | Nylon 6 | Nylon 6 | Nylon 6 | PBT[*3] | PBT[*3] | PET[*3] | PBT[*3] | PBT[*3] |
| Parts | 80 | 80 | 80 | 80 | 80 | 80 | 80 | 80 | 100 |
| Maleic anhydride Parts | 0.4 | 0.4 | 0.4 | 0.4 | — | — | — | — | — |
| Peroxide[*1] Parts | 0.1 | 0.1 | 0.1 | 0.1 | — | — | — | — | — |
| Compatibilizing agent[*2] Parts | — | — | — | — | — | 5 | 5 | 5 | — |
| Physical properties | | | | | | | | | |
| Izod impact strength (23° C.) (kg · cm/cm) | 68 | 81 | 85 | 45 | 39 | 83 | 85 | 32 | 5 |
| Appearance of molded article | ○ | ○ | ○ | X | ○ | ○ | ○ | X | ○ |

Note:
[*1] 2,5-Di(tert-butylperoxy)hexane
[*2] Ethylene-glycidyl methacrylate copolymer-grafted polymethyl methacrylate (Modiper 4200 manufactured by Nippon Oil & Fats Co., Ltd.)
[*3] Polybutylene terephthalate
[*4] Polyethylene terephthalate

EXAMPLE 27 (PREPARATION OF COMPOSITION OF HYDROGENATED DIENE BLOCK COPOLYMER AND THERMOSETTING POLAR RESIN)

The hydrogenated diene block copolymer (Copolymer P-1) obtained in Example 1 was grafted with maleic anhydride to prepare a grafted product (a modified hydrogenated diene block copolymer), and the product was blended with a thermosetting polar resin to obtain a composition.

(1) Preparation of Modified Hydrogenated Diene Block Copolymer 100 parts by weight of the hydrogenated diene block copolymer (Copolymer P-1) obtained in Example 1 was maintained at 190° C. and placed in a mixer (HAAKE RHEOCORD SYSTEM 40 RHEOMIX MIXER 600 manufactured by HAAKE BUCHLER CO.). After 2 minutes, 2.5 parts of maleic anhydride was added and mixing was effected. Then, 0.15 part of an organic peroxide [2,5-dimethyl-2,5-di(tert-butylperoxy)hexane, Perhexa 25B manufactured by NIPPON OIL & FATS CO., LTD.) was added, and kneading was continued for a further 5 minutes to obtain a hydrogenated diene block copolymer (hereinafter referred to as Copolymer P-9). The amount of maleic anhydride grafted in Copolymer P-9 was 0.60%.

(2) Preparation of Composition with Thermosetting Polar Resin (Epoxy Resin)

A thermosetting resin composition (an epoxy resin composition) was obtained according to the following procedure.

| Compoundinq recipe | Parts |
|---|---|
| Copolymer P-9 | 10 |
| Cresol-novolac type epoxy resin (epoxy equivalent: 220) | 100 |
| Phenol resin (novolac type) | 50 |
| Curing agent (2-methylimidazole) | 5 |

The above materials of the above amounts were kneaded using a closed type mixer at about 80° C. The kneaded product was press-molded at 160° C. The resulting plate was processed with a milling cutter to prepare test samples for measurement of physical properties.

The results of measurement are shown in Table 6.

EXAMPLES 28-29

Two epoxy resin compositions were obtained in the same manner as in Example 27, except that the amount of the modified hydrogenated diene block copolymer (Copolymer P-9) used was changed to 2 or 30 parts.

The results of measurement of physical properties of the epoxy resin compositions are shown in Table 6.

COMPARATIVE EXAMPLE 12

An epoxy resin composition was obtained in the same manner as in Example 27, except that Copolymer P-9 was changed to 10 parts of a liquid carboxy NBR (Hycar CTBN 1300×8 manufactured by BF Goodrich Co.) widely used for modification of epoxy resin.

The results of measurement of physical properties of the epoxy resin composition are shown in Table 6.

COMPARATIVE EXAMPLE 13

An epoxy resin composition was obtained in the same manner as in Example 27, except that no hydrogenated diene block copolymer (Copolymer P-9) was used. The results of measurement of physical properties of the epoxy resin composition are shown in Table 6.

EXAMPLE 30

A phenol resin composition was prepared according to the following procedure, using the modified hydrogenated diene block copolymer (Copolymer P-9) obtained in the same manner as in Example 27.

| Compoundinq recipe | Parts |
|---|---|
| Copolymer P-9 | 10 |
| Phenol resin (novolac type) | 100 |
| Curing agent (hexamethylenetetramine) | 10 |

-continued

| Compounding recipe | Parts |
| --- | --- |

The above materials of the above amounts were kneaded at 130° C. for 5 minutes using an electrically heated roll. The kneaded product was ground and press-molded at 160° C. for 10 minutes to obtain a plate of 4 mm in thickness. The plate was processed in accordance with JIS K 6911 using a milling machine to prepare test pieces. The test pieces were measured for physical properties. The results of measurement are shown in Table 6.

COMPARATIVE EXAMPLE 14

A phenol resin composition was prepared in the same manner as in Example 30, except that the Copolymer P-9 was replaced by 10 parts of the same liquid carboxy NBR as used in Comparative Example 12. Test pieces were prepared from the composition in the same manner as in Example 30, and measured for physical properties. The results of measurement are shown in Table 6.

COMPARATIVE EXAMPLE 15

A phenol resin was prepared in the same manner as in Example 30, except that the modified hydrogenated diene block copolymer (Copolymer P-9) was not used. Test pieces were prepared from the composition in the same manner as in Example 30, and measured for physical properties. The results of measurement are shown in Table 6.

As is clear from Table 6, the compositions of Examples 27–30 using the modified hydrogenated diene block copolymer of this invention are superior in both Izod impact resistance and flexural modulus.

Meanwhile, the compositions or resin of Comparative Examples 12–15 are inferior in Izod impact resistance, flexural modulus, etc. and show no sufficient resin-modification effect.

TABLE 6

|  | Example | | | Comparative Example | | Example | Comparative Example | |
| --- | --- | --- | --- | --- | --- | --- | --- | --- |
|  | 27 | 28 | 29 | 12 | 13 | 30 | 14 | 15 |
| Compounding recipe | | | | | | | | |
| Copolymer (I) | | | | | | | | |
| Type | Copolymer P-9 | Copolymer P-9 | Copolymer P-9 | Liq. NBR | — | Copolymer P-9 | Liq. NBR | — |
| Parts | 10 | 2 | 30 | 10 | — | 10 | 10 | — |
| Polar resin (III) | | | | | | | | |
| ① Type | CNER[*1] | CNER[*1] | CNER[*1] | CNER[*1] | CNER[*1] | — | — | — |
| Parts | 100 | 100 | 100 | 100 | 100 | — | — | — |
| ② Type | PR[*2] | PR[*2] | PR[*2] | PR[*2] | PR[*2] | PR[*2] | PR[*2] | PR[*2] |
| Parts | 50 | 50 | 50 | 50 | 50 | 100 | 100 | 100 |
| Curing agent | | | | | | | | |
| ① Type | MI[*3] | MI[*3] | MI[*3] | MI[*3] | MI[*3] | — | — | — |
| Parts | 5 | 5 | 5 | 5 | 5 | — | — | — |
| ② Type | — | — | — | — | — | HMTM[*4] | HMTM[*4] | HMTM[*4] |
| Parts | — | — | — | — | — | 10 | 10 | 10 |
| Physical properties | | | | | | | | |
| Izod impact strength (23° C.) (kg · cm/cm) | 6.3 | 4.3 | 8.2 | 3.5 | 3.2 | 3.3 | 1.0 | 1.2 |
| Flexural modulus (kg · f/cm$^2$) | 5.5 | 4.8 | 8.2 | 4.6 | 4.2 | 3.6 | 2.4 | 2.2 |
| Volume resistivity | $1.6 \times 10^{16}$ | $1.5 \times 10^{16}$ | $1.1 \times 10^{16}$ | $8.9 \times 10^{14}$ | $1.5 \times 10^{16}$ | $1.1 \times 10^{14}$ | $1.7 \times 10^{13}$ | $1.1 \times 10^{14}$ |

Note:
[*1]Cresol-novolac type epoxy resin
[*2]Phenol resin (novolac type)
[*3]2-Methylimidazole
[*4]Hexamethylenetetramine

EXAMPLES 31–35 (PREPARATION OF MODIFIED HYDROGENATED DIENE COPOLYMER)

One of the hydrogenated diene block copolymers (Copolymers Q-1 to Q-4) obtained in Examples 5–8 was subjected to the same graft polymerization as in Example 27 to obtain modified hydrogenated diene block copolymers (hereinafter referred to, respectively, as Copolymers Q-12 to Q-16). The properties of Copolymers Q-12 to Q-16 are shown in Table 7.

TABLE 7

|  | Example | | | | |
| --- | --- | --- | --- | --- | --- |
|  | 31 | 32 | 33 | 34 | 35 |
| Modified hydrogenated diene block copolymer | Copolymer Q-12 | Copolymer Q-13 | Copolymer Q-14 | Copolymer Q-15 | Copolymer Q-16 |
| Compounding recipe (parts) | | | | | |
| Hydrogenated diene block copolymer | Copolymer Q-1 | Copolymer Q-1 | Copolymer Q-2 | Copolymer Q-3 | Copolymer Q-4 |
| Maleic anhydride | 2.5 | 6.0 | — | — | 2.5 |
| Glycidyl methacrylate | — | — | 2.5 | — | — |
| Diethylaminoethyl methacrylate | — | — | — | 4.0 | — |
| Perhexa 25B | 0.15 | 0.30 | 0.15 | 0.15 | 0.15 |
| Analysis of grafted product (amount of monomer grafted, parts) | | | | | |
| Maleic anhydride | 0.70 | 2.0 | — | — | 0.62 |
| Glycidyl methacrylate | — | — | 0.39 | — | — |
| Diethylaminoethyl methacrylate | — | — | — | 1.2 | — |

TABLE 7-continued

| | Example | | | | |
|---|---|---|---|---|---|
| | 31 | 32 | 33 | 34 | 35 |
| Modified hydrogenated diene block copolymer | | | | | |
| Hydrogenation degree (%) | 99 or more | 99 or more | 99 or more | 99 or more | 99 or more |
| Molecular weight ($\times 10^{-4}$) | 30 | 30 | 32 | 29 | 30 |
| Easiness of pelletization | ○ | ○ | ○ | ○ | ○ |
| Blocking tendency of pellets | ○ | ○ | ○ | ◉ | ◉ |

EXAMPLES 36–40 AND COMPARATIVE EXAMPLES 16–19 (PREPARATION OF COMPOSITIONS OF MODIFIED HYDROGENATED DIENE BLOCK COPOLYMER AND THERMOSETTING POLAR RESIN)

In Examples 36–40, thermosetting resin compositions (epoxy resin compositions) were obtained in the same manner as in Example 27, except that the Copolymer P-9 was replaced by 10 parts of one of the modified hydrogenated diene block copolymers (Copolymers Q-12 to Q-16) obtained in Examples 31–35.

In Comparative Examples 16–19, epoxy resin compositions were obtained in the same manner as in Example 36, except that the modified hydrogenated diene block copolymer (Copolymer Q-12) was replaced by 10 parts of the unhydrogenated diene block copolymer obtained in Example 5 (Comparative Example 16), 10 parts of liquid carboxy NBR (Hycar CTBN manufactured by BF Goodrich Co.) (Comparative Example 17) or 10 parts of an acrylonitrile-butadiene rubber (JSR N 220S manufactured by Japan Synthetic Rubber Co., Ltd., bound acrylonitrile content=41%, Mooney viscosity=56) (Comparative Example 18) or was not used (Comparative Example 19). The epoxy resin compositions obtained in Examples 36–40 and Comparative Examples 16–19 were evaluated. The results of evaluation are shown in Table 8.

As is clear from Table 8, the epoxy resin compositions of this invention have good mechanical strengths and superior heat resistance, flexibility and moldability.

TABLE 8

| | Example | | | | | Comparative Example | | | |
|---|---|---|---|---|---|---|---|---|---|
| | 36 | 37 | 38 | 39 | 40 | 16 | 17 | 18 | 19 |
| Compounding recipe | | | | | | | | | |
| Copolymer blended | | | | | | | | | |
| Type | Copolymer Q-12 | Copolymer Q-13 | Copolymer Q-14 | Copolymer Q-15 | Copolymer Q-16 | Unhydrogenated Q-1 | CTBN | JSR N220S | — |
| parts | 10 | 10 | 10 | 10 | 10 | 10 | 10 | 10 | — |
| Physical properties | | | | | | | | | |
| Flexural modulus (kg · f/cm$^2$) | 2.3 | 2.6 | 2.1 | 2.8 | 2.1 | 3.4 | 4.6 | 5.1 | 4.2 |
| Izod impact strength (23° C.) (kg · cm/cm) | 5.6 | 6.1 | 5.2 | 5.5 | 5.6 | 3.7 | 3.2 | 5.5 | 3.5 |
| Izod impact strength after thermal aging*[1] (23° C.) (kg · cm/cm) | 5.2 | 6.0 | 5.1 | 5.3 | 5.1 | 3.5 | 2.9 | 3.9 | 3.6 |
| Flow property (cc/sec, $\times 10^{-2}$) | 4.5 | 4.0 | 3.5 | 3.0 | 3.2 | 2.9 | 3.4 | 3.0 | 6.3 |

Note:
*[1] 150° C. × 120 hours

EXAMPLES 41–45

Phenol resin compositions were obtained in the same manner as in Example 30, except that the modified hydrogenated diene block copolymer (Copolymer P-9) used in Example 30 was replaced by the modified hydrogenated diene block copolymers (Copolymers Q-12 to Q-16) used in Examples 36 to 40, respectively. The results of evaluation of these compositions are shown in Table 9.

TABLE 9

| | Example | | | | | Comparative Example | | |
|---|---|---|---|---|---|---|---|---|
| | 41 | 42 | 43 | 44 | 45 | 20 | 21 | 22 |
| Compounding recipe | | | | | | | | |
| Copolymer blended | | | | | | | | |
| Type | Copolymer Q-12 | Copolymer Q-13 | Copolymer Q-14 | Copolymer Q-15 | Copolymer Q-16 | Unhydrogenated Q-1 | CTBN | JSR N220S |
| parts | 10 | 10 | 10 | 10 | 10 | 10 | 10 | 10 |
| Physical properties | | | | | | | | |
| Flexural modulus (kg · f/cm$^2$) | 2.1 | 2.2 | 1.8 | 2.0 | 1.9 | 2.7 | 2.2 | 2.2 |
| Izod impact strength (23° C.) (kg · cm/cm) | 2.6 | 2.9 | 2.5 | 2.7 | 2.9 | 2.4 | 1.2 | 1.2 |
| Izod impact strength after thermal aging*[1] (23° C.) (kg · cm/cm) | 2.0 | 2.4 | 2.2 | 2.2 | 2.3 | 0.9 | 1.0 | 1.0 |

Note:
*[1] 150° C. × 120 hours

EXAMPLES 46–50 AND COMPARATIVE EXAMPLES 23–24 (PREPARATION OF COMPOSITIONS OF HYDROGENATED DIENE COPOLYMER AND POLAR RESIN)

One of the modified hydrogenated diene block copolymers and one of the polar resins all shown in Table 10 were melt-kneaded using a twin-screw extruder. The kneaded product (composition) was pelletized, dried thoroughly and subjected to injection molding to prepare test pieces for measurement of physical properties. The results of measurement of physical properties are shown in Table 10.

The compositions of Examples 46–50 are superior in both impact resistance and appearance of molded article.

Meanwhile, the composition of Comparative Example 23 is inferior in impact resistance and appearance of molded article and the composition of Comparative Example 24 is inferior in impact resistance.

aluminum chloride. The resulting mixture was subjected to reaction for 1 hour with the reaction mixture being maintained at 10.0 kg/cm$^2$ with hydrogen gas.

The reaction mixture was cooled to room temperature, taken out of the autoclave, subjected to steam stripping to remove the solvent, and dried on a 120° C. roll.

The resulting hydrogenated diene block copolymer (hereinafter referred to as Copolymer G-1) was measured for properties in accordance with the above-mentioned test methods. As a result, the total bound styrene content in the copolymer before hydrogenation was 30% by weight, the bound styrene content of the polymer block obtained in the first stage polymerization was 100%, and from the monomer conversion and the amount of the finally obtained copolymer, the proportion of the bound styrene content of the polymer block obtained in the first-stage polymerization in the final copolymer before hydrogenation was calculated to be 5%. The polymer block formed in the first-stage poly-

TABLE 10

|  | Example 46 | Example 47 | Comparative Example 23 | Example 48 | Example 49 | Comparative Example 24 | Example 50 |
|---|---|---|---|---|---|---|---|
| Compounding recipe |  |  |  |  |  |  |  |
| Copolymer (I) |  |  |  |  |  |  |  |
| Type | Copolymer Q-12 | Copolymer Q-13 | Copolymer P-5 | Copolymer Q-14 | Copolymer Q-15 | Copolymer P-5 | Copolymer Q-16 |
| Parts | 20 | 20 | 20 | 20 | 20 | 20 | 20 |
| Polar resin (III) |  |  |  |  |  |  |  |
| Type | N-66*[1] | N-66*[1] | N-66*[1] | PBT*[2] | PAc*[3] | PAc*[3] | PC*[4] |
| Parts | 80 | 80 | 80 | 80 | 80 | 80 | 80 |
| Physical properties |  |  |  |  |  |  |  |
| Izod impact strength (23° C.) (kg · cm/cm) | 80 | 85 | 5 | NB | 20 | 5 | 50 |
| Appearance of molded article | ○ | ○ | X | ○ | ○ | ○ | ○ |

Note:
*[1]Nylon 6,6 (Amilan CM3006 manufactured by TORAY INDUSTRIES, LTD.)
*[2]Polybutylene terephthalate (Duranex XD 499 manufactured by Polyplastic K.K.)
*[3]Polyacetal (Duracon M90 manufactured by Polyplastic K.K.)
*[4]Polycarbonate (Iupilon S-100 manufactured by MITSUBISHI GAS CHEMICAL CO., LTD.)

EXAMPLE 51 (PREPARATION OF HYDROGENATED DIENE BLOCK COPOLYMER G-1)

Into a 5-liter autoclave were fed 2,500 g of degassed and dehydrated cyclohexane and 25 g of styrene. Thereto were added 9.8 g of tetrahydrofuran and 0.2 g of n-butyllithium. The mixture was subjected to isothermal polymerization at 50° C. (first-stage polymerization).

When the conversion reached 100%, further polymerization was conducted at 70° C. while continuously adding a mixture of 300 g of 1,3-butadiene and 75 g of styrene at a rate of 75 g per 10 minutes (second-stage polymerization).

When the conversion reached approximately 100%, a mixture of 50 g of 1,3-butadiene and 50 g of styrene was added at one time and adiabatic polymerization was effected (third-stage polymerization). Sampling was made at intervals of 5 minutes in the course of the polymerization and the polymers formed at each sampling timing were measured for bound styrene content and micro structure of 1,3-butadiene.

When the conversion of the monomers added reached approximately 100%, the reaction mixture was cooled to 70° C. Thereto were added 0.6 g of n-butyllithium, 0.6 g of 2,6-tert-butylcresol, 0.28 g of bis(cyclopentadienyl)titanium dichloride and 1.1 g of diethylmerization is referred to as Block (A).

Successive analysis indicated that the second-stage polymerization proceeded so that the reaction product at each sampling timing had a constant styrene/1,3-butadiene ratio. Measurement by GPC indicated that with the proceeding of the reaction the molecular weight of polymer increased gradually without partial formation of low-molecular polymer and the living reaction proceeded as desired. The vinyl content of this 1,3-butadiene portion was found to be 40% by analysis. The polymer component formed in the second-stage polymerization is referred to as Block (B).

In the third-stage polymerization, it was confirmed that the styrene content increased gradually with the proceeding of polymerization.

The gradual increase of styrene content exhibits a behavior of almost quadratic function. According to the calculation based on the analytical results, the amount of bound styrene was about 50% at the beginning of the third-stage polymerization and about 100% at the end of the third-stage polymerization. The polymer block formed in the third-stage polymerization is referred to as Tapered Block (C).

The total of the bound styrene contents in Block (A) and Tapered Block (C) was found to be 15% based on the total copolymer based on the analytical values and the conversion.

By analyzing the amount of the residual double bond in the conjugated diene portion in the hydrogenated diene block copolymer (Copolymer G-1), the hydrogenation degree of Copolymer G-1 was found to be 98%.

The hydrogenated diene block copolymer had a molecular weight of 160,000 and a melt flow rate of 35 g/10 min at 230° C. under a load of 5 kg.

The above hydrogenated diene block copolymer caused no blocking of pellets.

EXAMPLE 52 (PREPARATION OF HYDROGENATED DIENE BLOCK COPOLYMER G-2)

A hydrogenated diene block copolymer (hereinafter referred to as Copolymer G-2) was obtained in the same manner as in Example 51, except that the following polymerization recipes were used.
First-stage polymerization
Styrene: 20 g
Tetrahydrofuran: 9.8 g
Second-stage polymerization
Styrene: 40 g
1,3-Butadiene: 410 g
Third-stage polymerization
Styrene: 15 g
1,3-Butadiene: 15 g
The properties of Copolymer G-2 are shown in Table 11.

EXAMPLE 53 (PREPARATION OF HYDROGENATED DIENE BLOCK COPOLYMER G-3)

A hydrogenated diene block copolymer (hereinafter referred to as Copolymer G-3) was obtained in the same manner as in Example 51, except that the following polymerization recipes were used.
First-stage polymerization
Styrene: 25 g
Tetrahydrofuran: 3 g
Second-stage polymerization
Styrene: 7 5 g
1,3-Butadiene: 300 g
Third-stage polymerization
Styrene: 15 g
1,3-Butadiene: 15 g
The properties of Copolymer G-3 are shown in Table 11.

EXAMPLE 54 (PREPARATION OF HYDROGENATED DIENE BLOCK COPOLYMER G-4)

A hydrogenated diene block copolymer (hereinafter referred to as Copolymer G-4) was obtained in the same manner as in Example 51, except that the following polymerization recipes were used.
First-stage polymerization
Styrene: 25 g
Tetrahydrofuran: 8 g
Second-stage polymerization
Styrene: 75 g
1,3-Butadiene: 250 g
Third-stage polymerization
Styrene: 75 g
1,3-Butadiene: 75 g
The properties of Copolymer G-4 are shown in Table 4.

COMPARATIVE EXAMPLE 25 (PREPARATION OF HYDROGENATED DIENE BLOCK COPOLYMER G-5)

A hydrogenated diene block copolymer (hereinafter referred to as Copolymer G-5) was obtained in the same manner as in Example 51, except that the following polymerization recipes were used.
First-stage polymerization
Styrene: 25 g
Tetrahydrofuran: 100 g
Second-stage polymerization
Styrene: 75 g
1,3-Butadiene: 300 g
Third-stage polymerization
Styrene: 50 g
1,3-Butadiene: 50 g
The properties of Copolymer G-5 are shown in Table 11.

COMPARATIVE EXAMPLE 26 (PREPARATION OF HYDROGENATED DIENE BLOCK COPOLYMER G-6)

A hydrogenated diene block copolymer (hereinafter referred to as Copolymer G-6) was obtained in the same manner as in Example 51, except that the following polymerization recipes were used.
First-stage polymerization
Styrene: 75 g
Tetrahydrofuran: 10 g
Second-stage polymerization
1,3-Butadiene: 350 g
Third-stage polymerization
Styrene: 75 g
The properties of Copolymer G-6 are shown in Table 11.

The copolymers obtained in Examples 51–54 which are the hydrogenated diene block copolymers of this invention, caused no blocking among pellets in pelletization, and exhibited modification effect which is the object of this invention. When blended with other resins as shown in Example 55 et seq.

Meanwhile, the copolymer obtained in Comparative Example 26, as compared with those obtained in Examples 51–54, exhibited inferior modification effect when blended with other resins.

TABLE 11

|  | Example | | | | Comparative Example | | |
| --- | --- | --- | --- | --- | --- | --- | --- |
|  | 51 | 52 | 53 | 54 | 1 | 25 | 26 |
| Hydrogenated diene block copolymer | Copolymer G-1 | Copolymer G-2 | Copolymer G-3 | Copolymer G-4 | Copolymer G-5*1 | Copolymer G-5 | Copolymer G-6*2 |
| Micro structure |  |  |  |  |  |  |  |
| ① Total bound styrene content (%) | 30 | 15 | 30 | 35 | 30 | 30 | 30 |
| ② Proportion of total bound styrene content of Block (A) and Tapered Block (C) in total copolymer (%) | 15 | 7 | 15 | 20 | — | 15 | 30 |
| ③ Proportion of bound styrene content of Block (A) in total copolymer (%) | 5 | 4 | 5 | 10 | — | 5 | 15 |

TABLE 11-continued

|  | Example | | | | Comparative Example | | |
|---|---|---|---|---|---|---|---|
|  | 51 | 52 | 53 | 54 | 1 | 25 | 26 |
| ④ Vinyl content of butadiene portion in Block (B) (%) | 40 | 40 | 20 | 35 | 40 | 40 | 40 |
| Properties of copolymer | | | | | | | |
| ① Hydrogenation degree (%) | 98 | 97 | 96 | 98 | 97 | 79 | 97 |
| ② Molecular weight ($\times 10^{-4}$) | 16 | 17 | 18 | 18 | 17 | 18 | 10 |
| ③ Melt flow rate (230° C., 5 Kg) | 35 | 30 | 32 | 28 | 28 | 41 | 3 |
| ④ Blocking tendency of pellets | ⊚ | ○ | ⊚ | ⊚ | X | ○ | ⊚ |

Note:
*[1]Hydrogenation product of random copolymer of styrene and 1,3-butadiene.
*[2]Hydrogenation product of polystyrene-polybutadiene-polystyrene triblock copolymer.

EXAMPLES 55–58 AND COMPARATIVE of Comparative Example 29 further had low surface gloss.

TABLE 12

|  | Example | | | | Comparative Example | | | |
|---|---|---|---|---|---|---|---|---|
|  | 55 | 56 | 57 | 58 | 27 | 28 | 29 | 7 |
| Compounding recipe | | | | | | | | |
| Copolymer (I) | | | | | | | | |
| Type | Copolymer G-1 | Copolymer G-2 | Copolymer G-3 | Copolymer G-4 | Copolymer G-5 | Copolymer G-6 | EP*[2] | — |
| Parts | 25 | 25 | 25 | 25 | 25 | 25 | 25 | — |
| Non-polar resin (II) | | | | | | | | |
| Type | PP*[1] | PP*[1] | PP*[1] | PP*[1] | PP*[1] | PP*[1] | PP*[1] | PP*[1] |
| Parts | 75 | 75 | 75 | 75 | 75 | 75 | 75 | 100 |
| Physical properties | | | | | | | | |
| Melt flow rate (230° C., 2.16 kg) (g/10 min) | 10 | 10 | 11 | 9.0 | 12 | 5.0 | 5.0 | 14 |
| Izod impact strength (−40° C.) (kg · cm/cm) | 29 | 25 | 26 | 22 | 27 | 7.1 | 14 | 4.1 |
| Flexural modulus (kg · f/cm$^2$) | 6,800 | 6,600 | 6,900 | 7,000 | 6,800 | 6,300 | 6,200 | 10,300 |
| Surface gloss (incident angle = 60°) (%) | 70 | 69 | 64 | 72 | 50 | 41 | 25 | 63 |

Note:
*[1]Polypropylene resin (Polypropylene BC-2 manufactured by Mitsubishi Petrochemical Co., Ltd.)
*[2]Ethylene-propylene copolymer rubber (JSR EP07P manufactured by Japan Synthetic Rubber Co., Ltd.)

EXAMPLES 27–29 (PREPARATION OF COMPOSITIONS OF HYDROGENATED DIENE BLOCK COPOLYMER AND NON-POLAR RESIN)

Compositions of a hydrogenated diene block copolymer and a non-polar resin were obtained in the same manner as in Example 12 using each of the copolymers obtained in Examples 51–54. The results of measurement of physical properties of the compositions are shown in Table 12.

The compositions obtained in Examples 55–58 had good flow property, excellent impact resistance and rigidity, and good appearance. Meanwhile, as shown in Table 11, the composition obtained in Comparative Example 27 caused blocking of pellets; the compositions obtained in Comparative Examples 28, 29 and 7 had insufficient impact resistance; and the composition

EXAMPLES 59–64 AND COMPARATIVE EXAMPLES 30–32 (PREPARATION OF COMPOSITIONS OF HYDROGENATED DIENE BLOCK COPOLYMER AND POLAR RESIN)

A hydrogenated diene block copolymer, a polar resin and, in some cases, a compatibilizing agent all shown in Table 13 were melt kneaded using a twin-screw extruder, pelletized, dried thoroughly, and subjected to injection molding to prepare test pieces for measurement of physical properties. The results of measurement are shown in Table 13.

The compositions obtained in Examples 59–64 are superior in impact resistance and surface appearance, while the compositions obtained in Comparative Examples 30–32 have insufficient impact resistance.

TABLE 13

|  | Example | | | Comparative Example | Example | | | Comparative Example | |
|---|---|---|---|---|---|---|---|---|---|
|  | 59 | 60 | 61 | 30 | 62 | 63 | 64 | 31 | 32 |
| Compounding recipe | | | | | | | | | |
| Copolymer (I) | | | | | | | | | |
| Type | Copolymer G-1 | Copolymer G-2 | Copolymer G-1 | Copolymer G-6 | Copolymer G-1 | Copolymer G-1 | Copolymer G-1 | Copolymer G-6 | — |
| Parts | 20 | 20 | 20 | 20 | 20 | 20 | 20 | 20 | — |
| Polar resin (III) | | | | | | | | | |
| Type | N-6*[3] | N-6*[3] | N-66*[4] | N-6*[3] | PBT*[5] | PBT*[5] | PET*[6] | PBT*[5] | PBT*[5] |
| Parts | 80 | 80 | 80 | 80 | 80 | 80 | 80 | 80 | 100 |
| Maleic anhydride Parts | 0.4 | 0.4 | 0.4 | 0.4 | — | — | — | — | — |
| Peroxide*[1] Parts | 0.1 | 0.1 | 0.1 | 0.1 | — | — | — | — | — |

TABLE 13-continued

|  | Example | | | Comparative Example | Example | | | Comparative Example | |
| --- | --- | --- | --- | --- | --- | --- | --- | --- | --- |
|  | 59 | 60 | 61 | 30 | 62 | 63 | 64 | 31 | 32 |
| Compatibilizing agent*2 Parts | — | — | — | — | — | 5 | 5 | 5 | — |
| Physical properties |  |  |  |  |  |  |  |  |  |
| Izod impact strength (23° C.) (kg · cm/cm) | 65 | 80 | 85 | 45 | 37 | 79 | 80 | 32 | 5 |
| Appearance of molded article | ○ | ○ | ○ | X | ○ | ○ | ○ | X | ○ |

Note:
*¹2,5-Di(tert-butylperoxy)hexane
*²Ethylene-glycidyl methacrylate copolymer-grafted polymethyl methacrylate (Modiper 4200 manufactured by Nippon Oil & Fats Co., Ltd.)
*³Nylon-6
*⁴Nylon-6,6
*⁵Polybutylene terephthalate
*⁶Polyethylene terephthalate

EXAMPLES 65-68 (PREPARATION OF COMPOSITIONS OF HYDROGENATED DIENE BLOCK COPOLYMER AND THERMOSETTING POLAR RESIN)

A maleic anhydride-grafted product (modified hydrogenated diene block copolymer) (hereinafter referred to as Copolymer G-8) was prepared using the hydrogenated diene block copolymer (Copolymer G-1) obtained in Example 51, in the same manner as in Example 27. Then, the product was combined with a thermosetting polar resin to obtain four compositions, in the same manner as in Examples 27 and 30. The results are shown in Table 14.

The pellets were thoroughly dried and subjected to injection molding to prepare test pieces for measurement of physical properties. The results of measurement are shown in Table 16.

In the above compounding, there was used, as an antioxidant, 0.2 part of IRGANOX 1010 manufactured by Ciba-Geigy Corp.

The crosslinking agent/crosslinking aid in Table 16 are Perhexa 25B (a peroxide manufactured by Nippon Oil & Fats Co., Ltd.)/divinylbenzene.

Polyolefins

Polymer A-1 (polypropylene):
  MH 8 manufactured by Mitsubishi PetroChemical

TABLE 14

|  | Example | | | Comparative Example | | Example | Comparative Example | |
| --- | --- | --- | --- | --- | --- | --- | --- | --- |
|  | 65 | 66 | 67 | 33 | 13 | 68 | 14 | 15 |
| Compounding recipe |  |  |  |  |  |  |  |  |
| Copolymer (I) |  |  |  |  |  |  |  |  |
| Type | Copolymer G-8 | Copolymer G-8 | Copolymer G-8 | Liq. NBR | — | Copolymer G-8 | Liq. NBR | — |
| Parts | 10 | 2 | 30 | 10 | — | 10 | 10 | — |
| Polar resin (III) |  |  |  |  |  |  |  |  |
| ① Type | CNER*¹ | CNER*¹ | CNER*¹ | CNER*¹ | CNER*¹ | — | — | — |
| Parts | 100 | 100 | 100 | 100 | 100 | — | — | — |
| ② Type | PR*² | PR*² | PR*² | PR*² | PR*² | PR*² | PR*² | PR*² |
| Parts | 50 | 50 | 50 | 50 | 50 | 100 | 100 | 100 |
| Curing agent |  |  |  |  |  |  |  |  |
| ① Type | MI*³ | MI*³ | MI*³ | MI*³ | MI*³ | — | — | — |
| Parts | 5 | 5 | 5 | 5 | 5 | — | — | — |
| ② Type | — | — | — | — | — | HMTM*⁴ | HMTM*⁴ | HMTM*⁴ |
| Parts | — | — | — | — | — | 10 | 10 | 10 |
| Physical properties |  |  |  |  |  |  |  |  |
| Izod impact strength (23° C.) (kg · cm/cm) | 6.3 | 4.5 | 8.3 | 3.5 | 3.2 | 3.2 | 1.0 | 1.2 |
| Flexural modulus (kg · f/cm²) | 5.4 | 4.7 | 8.0 | 4.6 | 4.2 | 3.6 | 2.4 | 2.2 |
| Volume resistivity | $1.7 \times 10^{16}$ | $1.5 \times 10^{16}$ | $1.2 \times 10^{16}$ | $8.9 \times 10^{14}$ | $1.5 \times 10^{16}$ | $1.2 \times 10^{14}$ | $1.7 \times 10^{13}$ | $1.1 \times 10^{14}$ |

Note:
*¹Cresol-novolac type epoxy resin
*²Phenol resin (novolac type)
*³2-Methylimidazole
*⁴Hexamethylenetetramine

EXAMPLES 68-81 AND COMPARATIVE EXAMPLES 34-35

In the same manner as in Example 5, hydrogenated diethyl block copolymers as shown in Table 15 were obtained (hereinafter referred to as Copolymers Q-17 to Q-25).

One of the hydrogenated diene block copolymers shown in Table 15 and one of the polyolefins shown below were mixed according to the compounding recipe shown in Table 16, and then subjected to kneading and extrusion by twin-screw extruder to obtain pellets.

Co., Ltd.
Polymer A-1 (polypropylene):
  BC 3 manufactured by Mitsubishi PetroChemical Co., Ltd.

As is clear from Table 16, the composition of Comparative Example 34 uses a hydrogenated diene block copolymer component whose hydrogenation degree is outside the range of this invention, and is inferior in thermal ageing resistance and transparency; the composition of Comparative Example 35 uses an ethylene-α-olefin copolymer rubber and uses no hydrogenated diene block copolymer, and is inferior in tension set and transparency.

Meanwhile, the thermoplastic elastomer compositions of Examples 68–81 according to this invention are highly balanced in mechanical properties, thermal aging resistance, low hardness, low tension set and transparency, and for their excellent properties, can be used in automobile interior and exterior parts, electric and electronic parts, housings for electric and electronic apparatuses, etc. all requiring high quality.

TABLE 15

| Hydrogenated diene block copolymer | Copolymer Q-17 | Copolymer Q-18 | Copolymer Q-19 | Copolymer Q-20 | Copolymer Q-21 | Copolymer Q-22 | Copolymer Q-23 | Copolymer Q-24 | Copolymer Q-25 |
|---|---|---|---|---|---|---|---|---|---|
| Block copolymer before hydrogenation | | | | | | | | | |
| Bound styrene content of Block (A) (%) | 30 | 30 | 30 | 20 | 40 | 30 | 30 | 30 | 30 |
| Vinyl content of butadiene portion in Block (B) (%) | 80 | 70 | 90 | 80 | 80 | 80 | 80 | 80 | 80 |
| Coupling | Not made | Not made | Not made | Not made | Not made | Not made | Not made | Made | Not made |
| Polystyrene-reduced number-average molecular weight ($\times 10^{-4}$) | 12.1 | 12.1 | 12.1 | 12.1 | 12.1 | 7.0 | 18.5 | 26.0 | 12.1 |
| General formula | A-B-A | A-B-A | A-B-A | A-B-A | A-B-A | A-B-A | A-B-A | [A-B-A]$_4$Si | A-B-A |
| Hydrogenated diene block copolymer | | | | | | | | | |
| Hydrogenation degree of butadiene portion (%) | 99 or more | 99 or more | 99 or more | 99 or more | 99 or more | 99 or more | 99 or more | 99 or more | 51 |
| Hydrogenation degree of styrene portion (%) | 1 or less | 1 or less | 1 or less | 1 or less | 1 or less | 1 or less | 1 or less | 1 or less | 1 or less |

TABLE 16

| | Example | | | | | | | |
|---|---|---|---|---|---|---|---|---|
| | 68 | 69 | 70 | 71 | 72 | 73 | 74 | 75 |
| Compounding recipe (parts) | | | | | | | | |
| Polyolefin | | | | | | | | |
| Type | A-1 | A-1 | A-2 | A-1 | A-1 | A-1 | A-1 | A-1 |
| Amount | 40 | 25 | 25 | 25 | 25 | 25 | 25 | 25 |
| Hydrogenated diene block copolymer | | | | | | | | |
| Type | Copolymer Q-17 | Copolymer Q-17 | Copolymer Q-17 | Copolymer Q-17 | Copolymer Q-18 | Copolymer Q-19 | Copolymer Q-20 | Copolymer Q-21 |
| Amount | 60 | 75 | 75 | 75 | 75 | 75 | 75 | 75 |
| Oil | | | | | | | | |
| Type | — | — | — | Paraffinic | Paraffinic | Paraffinic | Paraffinic | Paraffinic |
| Amount | — | — | — | 60 | 60 | 60 | 60 | 60 |
| Crosslinking agent/ crosslinking acid | — | — | — | — | — | — | — | — |
| Evaluation results | | | | | | | | |
| Mechanical properties | | | | | | | | |
| $T_B$ (kg·f/cm$^2$) | 250 | 210 | 210 | 50 | 45 | 50 | 50 | 50 |
| $E_B$ (%) | 600 | 525 | 630 | 345 | 345 | 375 | 375 | 375 |
| Thermal aging resistance | | | | | | | | |
| $T_B$ (kg·f/cm$^2$) | 250 | 210 | 210 | 50 | 45 | 50 | 50 | 50 |
| $E_B$ (%) | 600 | 525 | 630 | 375 | 345 | 375 | 375 | 375 |
| Hardness (JIS A) | 96 | 88 | 88 | 50 | 53 | 47 | 49 | 51 |
| Tension set (%) | 12 | 7 | 6 | 4 | 5 | 6 | 5 | 5 |
| Transparency | ○ | ○ | ○ | ○ | ○ | ○ | ○ | ○ |

| | Example | | | | | | Comparative Example | |
|---|---|---|---|---|---|---|---|---|
| | 76 | 77 | 78 | 79 | 80 | 81 | 34 | 35 |
| Compounding recipe (parts) | | | | | | | | |
| Polyolefin | | | | | | | | |
| Type | A-1 | A-1 | A-1 | A-1 | A-1 | A-1 | A-1 | A-1 |
| Amount | 25 | 25 | 25 | 25 | 25 | 25 | 25 | 25 |
| Hydrogenated diene block copolymer | | | | | | | | |
| Type | Copolymer Q-22 | Copolymer Q-23 | Copolymer Q-24 | Copolymer Q-17 | Copolymer Q-17 | Copolymer Q-17 | Copolymer Q-25 | EPDM* |
| Amount | 75 | 75 | 75 | 75 | 75 | 75 | 75 | 75 |
| Oil | | | | | | | | |
| Type | Paraffinic | Paraffinic | Paraffinic | Paraffinic | Paraffinic | Paraffinic | Paraffinic | Paraffinic |
| Amount | 60 | 60 | 60 | 70 | 60 | 60 | 60 | 60 |
| Crosslinking agent/ crosslinking acid | — | — | — | — | 0.1/0.5 | — | — | — |
| Evaluation results | | | | | | | | |
| Mechanical properties | | | | | | | | |
| $T_B$ (kg·f/cm$^2$) | 42 | 45 | 54 | 45 | 55 | 52 | 35 | 48 |
| $E_B$ (%) | 315 | 375 | 345 | 600 | 465 | 435 | 285 | 330 |
| Thermal aging resistance | | | | | | | | |
| $T_B$ (kg·f/cm$^2$) | 42 | 52 | 54 | 45 | 53 | 52 | 5 | 48 |

TABLE 16-continued

| | | | | | | | | |
|---|---|---|---|---|---|---|---|---|
| $E_B$ (%) | 315 | 375 | 345 | 600 | 455 | 435 | 100 | 330 |
| Hardness (JIS A) | 39 | 50 | 50 | 37 | 55 | 48 | 40 | 60 |
| Tension set (%) | 4 | 4 | 4 | 2 | 2 | 3 | 8 | 9 |
| Transparency | ◯ | ◯ | ◯ | ◯ | ◯ | ◯ | △ | △ |

Note: *Ethylene-propylene-ethylidenenorbornene copolymer.

EXAMPLES 82–84

There were used, as component (M), a crystalline polypropylene (Mitsubishi Noblen MH-8 manufactured by Mitsubishi Petrochemical Co., Ltd.) and, as component (N), a hydrogenated random SBR having a styrene block at both terminals (styrene content=15% in terminal blocks, 50% in random SBR; butadiene content=35%; vinyl content=80%; polystyrene-reduced number-average molecular weight=300,000). The components (M) and (N) were kneaded according to the compounding recipes shown below and in Table 17 to prepare three crosslinked products. They were evaluated. The results are shown in Table 17.

The master batch of organic peroxide used in the above compounding was prepared by incorporating 10 parts of 2,5-dimethyl-2,5-di(tert-butylperoxy)hexyne-3 into 100 parts of an EPM ($ML_{1+4}^{100°C.}$=40, propylene content=49%) using a 6-inch roll.

Compounding Recipe

The polyolefin resin and hydrogenated diene block copolymer shown in Table 1 were placed in a 1-liter pressure type kneader (a product of Moriyama Seisakusho) heated at 170° C., and kneaded until the polyolefin resin was melted. After the polyolefin resin and the hydrogenated diene block copolymer were melt-kneaded uniformly, a given amount of a master batch of organic peroxide was added, and kneading was continued for a further 10 minutes to allow the organic peroxide to act to obtain three thermoplastic elastomer compositions. Each of the compositions was formed into a sheet using a 6-inch roll; the sheet was made into cubic pellets using a cubing pelletizer; the pellets were processed by an injection machine to prepare plate-shaped test pieces for measurement of physical properties. The results of measurement are shown in Table 17.

TABLE 17

| | | Example | | |
|---|---|---|---|---|
| | | 82 | 83 | 84 |
| Compounding recipe (part) | (M) Component Polyolefin resin PP | 20 | 40 | 60 |
| | (N) Component Hydrogenated end-blocked random SBR | 80 | 60 | 40 |
| | Crosslinking agent Peroxide master batch | 2.0 | 2.0 | 2.0 |
| | Co-crosslinking agent Divinylbenzene | 0.20 | 0.30 | 0.24 |
| | Extender oil (paraffinic oil) | 30 | — | — |
| Physical properties at ordinary state | 100% Tensile stress (kg/cm$^2$) | 22 | 74 | 126 |
| | 300% Tensile stress (kg/cm$^2$) | 61 | 92 | 130 |
| | Tensile strength (kg/cm$^2$) | 65 | 133 | 175 |
| | Elongation at break (%) | 350 | 550 | 500 |
| | Hardness (Shore D) | 60 (JIS A) | 45 | 60 |
| | Fatigue resistance (Length of cracks which grow when flexed 10$^4$ times) | 6 | 14 | 12 |
| | Appearance of molded article | ◯ | ◯ | ◯ |

EXAMPLES 85–88 AND COMPARATIVE EXAMPLE 36

The components (a) used in these Examples and Comparative Example were prepared as follows.

PREPARATION OF COMPONENT (a) (SYNTHESIS OF POLYMERS R-1 TO R-4

R-1

Into a 10-liter autoclave were fed 5,000 g of degassed and dehydrated cyclohexane and 120 g of styrene (first stage). Thereto were added 200 g of tetrahydrofuran and 0.3 g of n-butyllithium, and adiabatic polymerization was effected for 30 minutes starting from 50° C.

The reaction mixture was cooled to 10° C. 704 g of butadiene and 176 g of styrene (second stage) were added, and polymerization was effected.

Then, the reaction mixture was adjusted to 70° C., and thereto were added 1.5 g of n-butyllithium, 1.5 g of 2,6-di-tert-butyl-p-cresol, 0.5 g of bis(cyclopentadienyl)titanium dichloride and 2 g of diethylaluminum chloride. Hydrogenation was effected at a hydrogen pressure of 10 kg/cm$^2$. The reaction mixture was returned to an atmosphere of room temperature and atmospheric pressure, taken out of the autoclave, poured into water, and subjected to steam distillation to remove the solvent, to obtain a hydrogenated diene block copolymer (hereinafter referred to Copolymer R-1).

The hydrogenated diene block copolymer (Copolymer R-1) had a hydrogenation degree of 98% and a polystyrene-reduced number-average molecular weight of 300,000. The 1,2-vinyl content of butadiene portion in the copolymer before hydrogenation was 80%.

R-2

Under the conditions for the production of hydrogenated diene block copolymer (Copolymer R-1), there were changed the proportions of cyclohexane and tetrahydrofuran and the polymerization temperature, to obtain an unhydrogenated copolymer whose 1,2-vinyl content of butadiene portion was 40%. This copolymer was hydrogenated in the same manner as in the case of Copolymer R-1 to obtain a hydrogenated diene block copolymer (hereinafter referred to as Copolymer R-2) having a hydrogenation degree of 98% and a polystyrene-reduced number-average molecular weight of 300,000.

R-3

Under the same polymerization conditions as used in the case of the hydrogenated diene block copolymer (Copolymer R-2), polymerization was effected using 130 g of styrene (first stage) and, as second-stage components, 616 g of butadiene and 154 g of styrene. 100 g of styrene was fed as a third-stage component and polymerization was effected to obtain an unhydrogenated copolymer whose 1,2-vinyl content of butadiene portion was 40%. This copolymer was hydrogenated in the same manner as in the case of Copolymer R-2 to obtain a hydrogenated diene block copolymer (hereinafter referred to as Copolymer R-3) having a hydrogenation degree of 98% and a polystyrne-reduced number-average molecular weight of 300,000.

R-4

A hydrogenated diene copolymer (hereinafter referred to as Copolymer R-4) having a hydrogenation degree of 60% was obtained by changing the hydrogenation conditions of Copolymer R-2.

Preparation of Compositions

The components shown in Table 8 were melt-kneaded in the proportions shown in Table 8 using a twin-screw extruder. The resulting compositions were evaluated. In each composition was used, as a compatibilizing agent, 10 parts of an ethylene-glycidyl methacrylate copolymer-grafted styrene-acrylonitrile copolymer.

There were used, as the component (b), b-1 [polybutylene terephthalate] and, as the component (c), c-1 (ABS resin) and c-2 (polycarbonate).

TABLE 18

| | | | Evaluation results | |
|---|---|---|---|---|
| (a) Component Type and amount (parts) | (b) Component Type and amount (parts) | (c) Component Type and amount (parts) | Izod impact strength (kg · cm/cm) | Appearance of molded article |
| Example 85 | R-1 10 | b-1 40 | c-2 40 | 76 | ○ |
| Example 86 | R-2 10 | b-1 40 | c-2 40 | 92 | ○ |
| Example 87 | R-3 10 | b-1 40 | c-2 40 | 92 | ○ |
| Example 88 | R-4 10 | b-1 50 | c-2 30 | 65 | ○ |
| Comparative Example 36 | R-4 10 | b-1 40 | c-2 40 | 10 | x |

EXAMPLES 89–91 AND COMPARATIVE EXAMPLE 37

The components shown in Table 19 were melt-kneaded in the proportions shown in Table 19 using a twin-screw extruder. The resulting compositions were evaluated. In each composition, 10 parts of an ethylene-glycidyl methacrylate copolymer-grafted styrene-acrylonitrile copolymer was used as compatibilizing agent.

There were used, as the component (b'), b'-1 (nylon 6) and b'-2 (polyamide elastomer obtained from ξ-caprolactam and polyethylene glycol). There were used, as the component (c), c-1 (ABS resin) and c-4 (copolymer consisting of 27% of acrylonitrile and 73% of styrene).

TABLE 19

| | | (b') | | Evaluation results | |
|---|---|---|---|---|---|
| | (a) Component Type and amount (parts) | Component Type and amount (parts) | (c) Component Type and amount (parts) | Izod impact strength (kg · cm/cm) | Appearance of molded article |
| Example 89 | R-2 10 | b'-1 50 | c-1/c-4 | 75 | ○ |
| Example 90 | R-2 10 | b'-2 20 | c-1/c-4 25/5 25/35 | 63 | ○ |
| Example 91 | R-2 10 | b'-1/b'-2 30/20 | c-1/c-4 25/5 | 78 | ○ |
| Comparative Example 37 | R-4 10 | b'-1 50 | c-1/c-4 25/5 | 12 | x |

EXAMPLE 92 AND COMPARATIVE EXAMPLE 38

The components shown in Table 20 were melt-kneaded in the proportions shown in Table 20 using a twin-screw extruder. The resulting compositions were evaluated.

There were used, as the component (b''), b''-1 [polyphenylene ether] and, as the component (c), c-5 [polypropylene (MH 8 manufactured by Mitsubishi Petrochemical Co., Ltd.)].

TABLE 20

| | (a) Component Type and amount (parts) | (b') Component Type and amount (parts) | (c) Component Type and amount (parts) | Evaluation results | | |
|---|---|---|---|---|---|---|
| | | | | Izod impact strength (kg · cm/cm) | Heat deformation temperature (264 psi) (°C.) | Appearance of molded article |
| Example 92 | R-2 15 | b''-1 42.5 | c-5 42.5 | 54 | 92 | ○ |
| Comparative Example 38 | R-4 15 | b''-1 42.5 | c-5 42.5 | 4 | 70 | x |

As is clear from Tables 18–20, the compositions of Comparative Examples 36–38 use, as the component (a), a hydrogenated diene block copolymer of low hydrogenation degree deviating from the range of this invention and are inferior in impact resistance and appearance of molded article.

What is claimed is:

1. A hydrogenated diene block copolymer having a polystyrene-reduced number-average molecular weight of 50,000–600,000 which is a hydrogenation product of an (A)—(B) block copolymer in which (A) means an alkenyl aromatic compound polymer block and (B) means a conjugated diene homopolymer block wherein the vinyl content of the conjugated diene portion is more than 60%, or an (A)—(B)—(C) block copolymer in which (A) and (B) are as defined above and (C) means an alkenyl aromatic compound-conjugated diene copolymer tapered block wherein the proportion of the alkenyl aromatic compound increases gradually, or an (A)—(B)—(A) block copolymer in which (A) and (B) are as defined above, in which block copolymer
   (1) the weight proportion of the alkenyl aromatic compound/the conjugated diene is 5/95 to 60/40, and
   (2) the content of the bound alkenyl aromatic compound in at least one block (A) is at least 3% by weight and the total of the bound alkenyl aromatic compound contents in the two block (A)'s or the block (A) and the block (C) is 5–25% by weight based on the total monomers, and in which hydrogenation product at least 80% of the double bond unsaturations of the conjugated diene portion is saturated by the hydrogenation.

2. The hydrogenated diene block copolymer according to claim 1, wherein the block copolymer is a block copolymer represented by the general formula [(A)—(B)]$_n$—X, [(A)—(B)—(C)]$_n$—X or [(A)—(B)—(A)]$_n$—X wherein (A), (B) and (C) are the same as defined in claim 1, n is an integer of 2-4 and X is a coupling agent residue.

3. A modified hydrogenated diene block copolymer obtained by modifying 100 parts by weight of the hydrogenated diene block copolymer according to claim 1 or 2 with 0.01-20 parts by weight of an unsaturated compound having at least one functional group selected from the group consisting of acid anhydride group, carboxyl group, hydroxyl group, amino group and epoxy group.

4. The hydrogenated diene block copolymer according to claim 1, wherein (B) is a conjugated diene homopolymer block wherein the vinyl content of the conjugated diene portion is more than 60%.

* * * * *